(12) United States Patent
Ujimoto et al.

(10) Patent No.: US 10,942,149 B2
(45) Date of Patent: Mar. 9, 2021

(54) ION SENSOR, ION SENSOR MANUFACTURING METHOD, AND FIELD ASYMMETRIC ION MOBILITY SPECTROMETRY SYSTEM

(71) Applicant: Ricoh Company, Ltd., Tokyo (JP)

(72) Inventors: Katsuya Ujimoto, Hyogo (JP); Shinichi Kubota, Osaka (JP); Kunihiro Tan, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/929,053

(22) Filed: Oct. 18, 2018

(65) Prior Publication Data

US 2019/0204273 A1 Jul. 4, 2019

(30) Foreign Application Priority Data

Jan. 4, 2018 (JP) .............................. JP2018-000333

(51) Int. Cl.
*G01N 27/62* (2006.01)
*H01J 49/00* (2006.01)
(Continued)

(52) U.S. Cl.
CPC ........ *G01N 27/624* (2013.01); *H01J 49/0027* (2013.01); *H01J 49/10* (2013.01)

(58) Field of Classification Search
None
See application file for complete search history.

(56) References Cited

U.S. PATENT DOCUMENTS 8,319,177 B2 11/2012 Boyle et al.
2008/0191132 A1* 8/2008 Boyle .................. G01N 27/624
250/287

(Continued)

FOREIGN PATENT DOCUMENTS

JP 2007-534126 11/2007
JP 2012-069531 4/2012
(Continued)

OTHER PUBLICATIONS

Wilks et al. "Characterization of a miniature, ultra-high-field, ion mobility spectrometer", 15 Int. J. Ion Mobil. Spec. 199 (2012) (Year: 2012).*

(Continued)

*Primary Examiner* — James Choi
(74) *Attorney, Agent, or Firm* — Xsensus LLP

(57) ABSTRACT

An ion sensor, an ion sensor manufacturing method, and a field asymmetric ion mobility spectrometry (FAIMS) system. The ion sensor includes an ion filter including a first electrode and a second electrode facing each other, an ion sensing electrode with which an ion that has passed through the ion filter collides, and an insulator to electrically insulate the ion sensing electrode from the first electrode and the second electrode. The method includes forming a first slit on an active layer of an at least one SOI substrate, the at least one SOI substrate including a base layer, an insulating layer on the base layer, and the active layer on the insulating layer, dividing the active layer into two, forming a second slit through the base layer, the second slit overlapping with the first slit in a planar view, and forming a third slit through the insulating layer.

15 Claims, 21 Drawing Sheets

(51) Int. Cl.
    *G01N 27/624*     (2021.01)
    *H01J 49/10*     (2006.01)

(56) References Cited

U.S. PATENT DOCUMENTS

| | | |
|---|---|---|
| 2011/0006196 A1 | 1/2011 | Boyle et al. |
| 2017/0133190 A1 | 5/2017 | Ujimoto |

FOREIGN PATENT DOCUMENTS

| | | |
|---|---|---|
| JP | 2014-194427 | 10/2014 |
| JP | 2017-152494 | 8/2017 |
| WO | WO2001/008197 A1 | 2/2001 |
| WO | WO2002/083276 A1 | 10/2002 |
| WO | WO2005/104182 A2 | 11/2005 |
| WO | WO2006/013396 A2 | 2/2006 |
| WO | WO-2013061141 A1 * | 5/2013 |

OTHER PUBLICATIONS

Extended European Search Report dated Mar. 18, 2019 in European Patent Application No. 18199947.5, 11 pages.

Graf, A., "Entwicklung eines miniaturisierten Ionenfilters und Detektors fur die potentielle Anwendung in Ionenmobilitatsspektrometern", Retrieved from the internet: URL: http://publca.fraunhofer.de/eprints/urn_nun_de_bsz_14-qucosa-163935.pdf, Nov. 26, 2014, XP055561415, pp. 1-180 with cover pages (with partial English translation).

Wilks, A., et al., "Characterization of a miniature, ultra-high-field, ion mobility spectrometer", International Journal for Ion Mobility Spectrometry, Aug. 30, 2012, XP055541816, vol. 15 No. 3, pp. 199-222.

Owlstone: "Owlstone FAIMS Chip", Retrieved from the internet: URL: https://www.youtube.com/watch?time_continue,=20&v=XPjuL872tWE , XP054979176, Apr. 8, 2009, 2 pages.

* cited by examiner

ION SENSOR, ION SENSOR MANUFACTURING METHOD, AND FIELD ASYMMETRIC ION MOBILITY SPECTROMETRY SYSTEM

CROSS-REFERENCE TO RELATED APPLICATION

This patent application is based on and claims priority pursuant to 35 U.S.C. § 119(a) to Japanese Patent Application No. 2018-000333, filed on Jan. 4, 2018, in the Japan Patent Office, the entire disclosure of which is hereby incorporated by reference herein.

BACKGROUND

Technical Field

Embodiments of the present disclosure relate to an ion sensor, an ion sensor manufacturing method, and a field asymmetric ion mobility spectrometry (FAIMS) system.

Background Art

Various kinds of studies and discussions are conducted on detection and analysis of chemical substances performed by field asymmetric ion mobility spectrometry (FAIMS) systems. The FAIMS systems are provided with an ion filter having a pair of electrodes to which asymmetric alternating-current signals are applied, and ionized chemical substances are sorted according to a difference in the degree of mobility as the ionized chemical substances flow through the ion filter. As ionized chemical substances that have passed through the ion filter collide with an ion sensing electrode, and electric current is generated at the ion sensing electrode. The type of chemical substances can be identified by detecting the electric current generated at the ion sensing electrode.

Ion mobility spectrometers that relate to the FAIMS systems and have a structure to control the flow of the ionized chemical substances are known in the art.

SUMMARY

Embodiments of the present disclosure described herein provide an ion sensor, an ion sensor manufacturing method, and a field asymmetric ion mobility spectrometry (FAIMS) system. The ion sensor includes an ion filter including a first electrode and a second electrode, the first electrode and the second electrode facing each other, an ion sensing electrode with which an ion that has passed through the ion filter collides, and an insulator configured to electrically insulate the ion sensing electrode from the first electrode and the second electrode. The ion sensor manufacturing method includes forming a first slit on an active layer of an at least one SOI substrate, the at least one SOI substrate including a base layer, an insulating layer on the base layer, and the active layer on the insulating layer, dividing the active layer into two, forming a second slit through the base layer, the second slit overlapping with the first slit in a planar view, and forming a third slit through the insulating layer, the third slit joining the first slit and the second slit. The FAIMS system includes the ion sensor, an ion generator arranged before the ion sensor, and an ion current detector configured to detect electric current generated at the ion sensing electrode.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
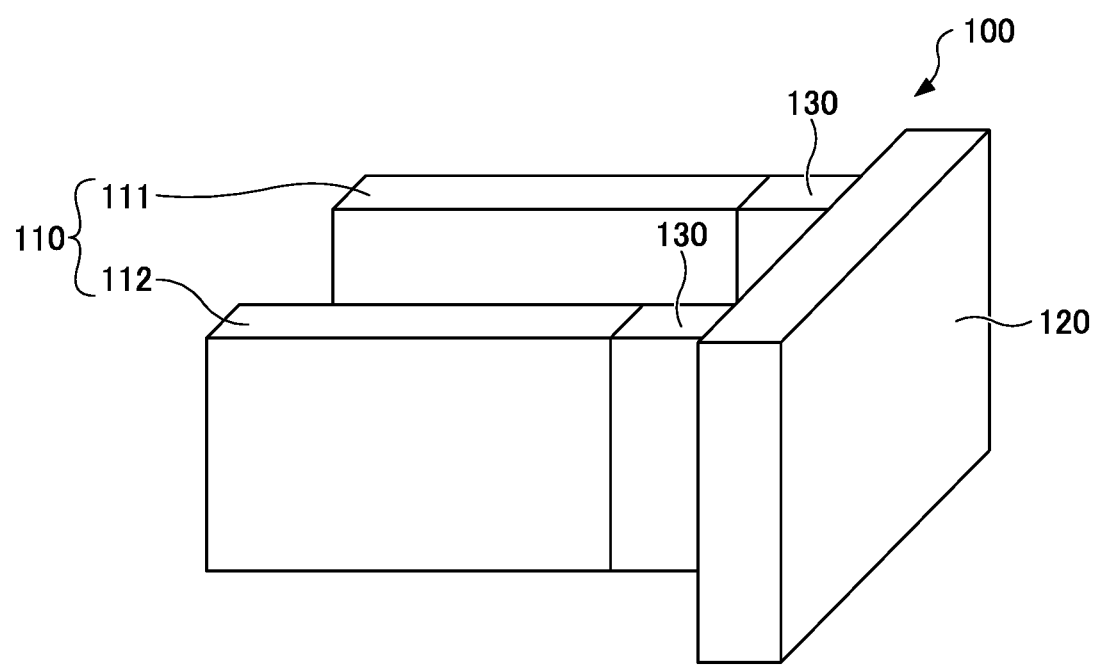
FIG. 1 is a schematic diagram illustrating an ion sensor according to a first embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In ion sensors used for the known FAIMS systems, a gap of centimeter (cm) order exists between an ion filter and an ion sensing electrode, and this gap affects the detectivity. Typically, ions tend to spatially disperse due to dispersion and the Coulomb repulsive force. For this reason, as the distance between the ion filter and the ion sensing electrode is longer, a loss of ion increases and the detectivity deteriorates. If the distance between the ion filter and the ion sensing electrode is shortened, the loss of ion can be reduced. However, if the distance between the ion filter and the ion sensing electrode is shortened, unwanted electric discharge tends to occur between the ion filter and the ion sensing electrode.

In the following description, an embodiment of the present disclosure is described with reference to the drawings.

First Embodiment

Firstly, a first embodiment of the present disclosure is described below.

FIG. 1 is a schematic diagram illustrating an ion sensor 100 according to the first embodiment of the present disclosure.

As illustrated in FIG. 1, the ion sensor 100 according to the first embodiment is provided with an ion filter 110 including a first electrode 111 and a second electrode 112 that face each other, an ion sensing electrode 120 with which an ion that has passed through the ion filter 110 collides, and a solid insulator 130 that electrically insulates the ion sensing electrode 120 from the first electrode 111 and the second electrode 112.

The basic principle of the ion sensor 100 is described below.

Figure 2:
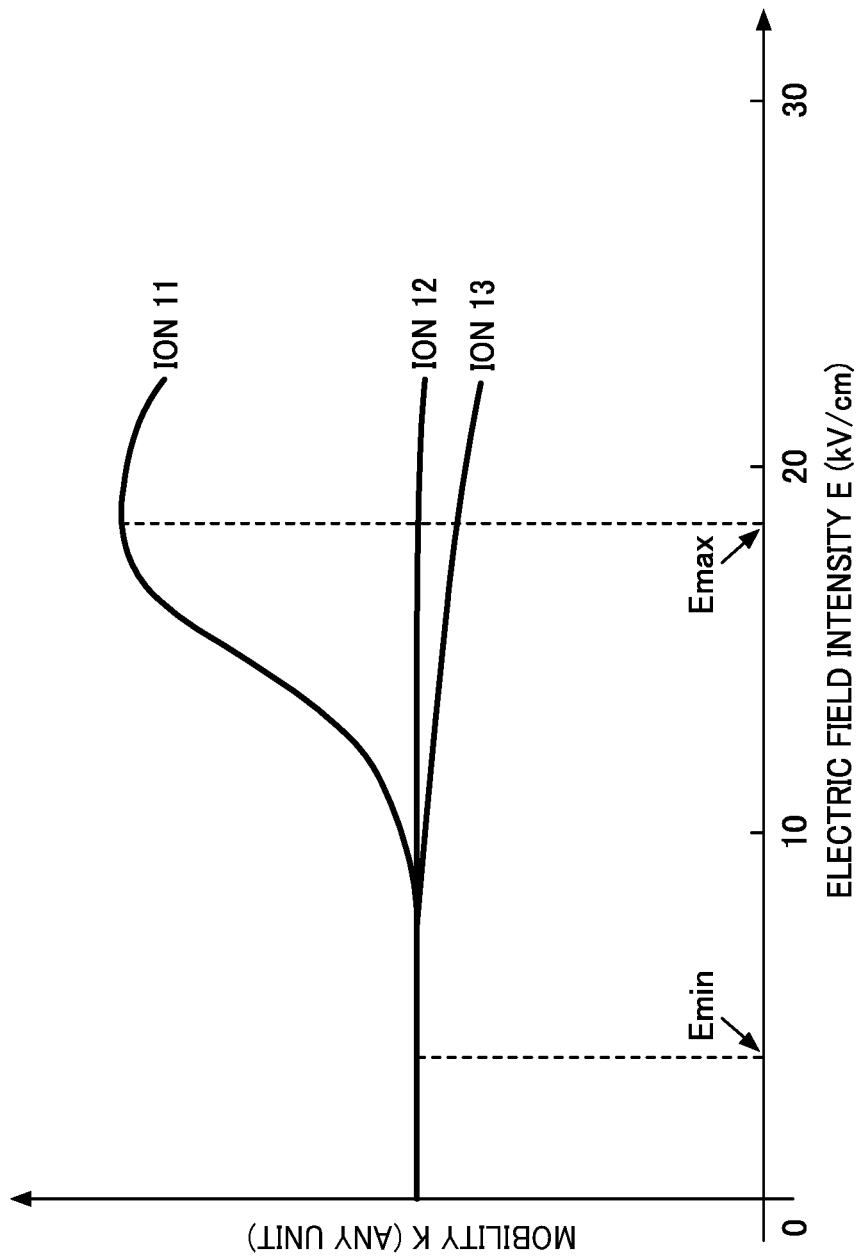
FIG. 2 is a diagram illustrating a dependency on the electric field intensity of the mobility of ions, according to an embodiment of the present disclosure.

FIG. 2 is a diagram illustrating a dependency on the electric field intensity of the mobility of ions, according to the present embodiment.

Figure 3:
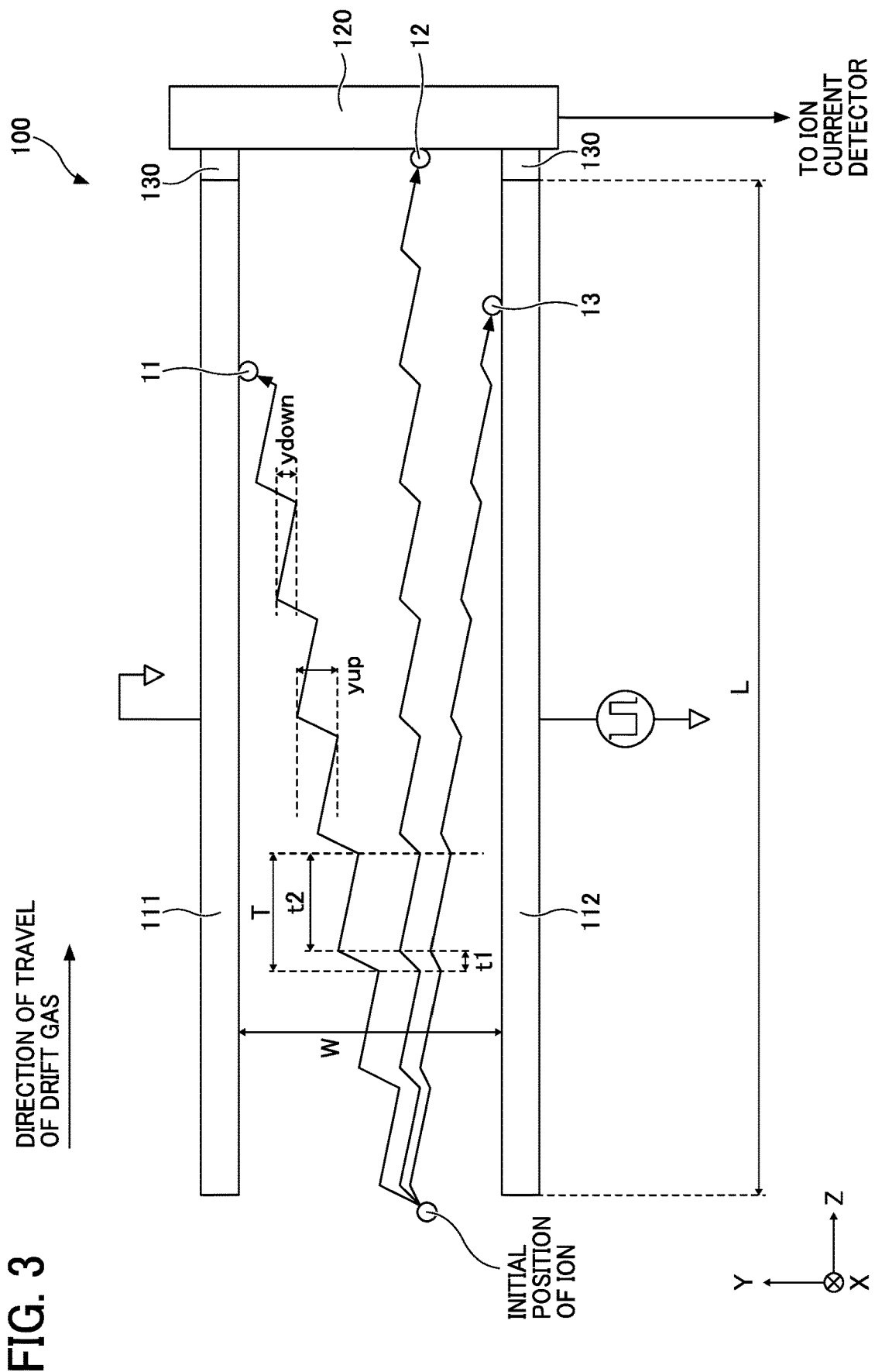
FIG. 3 is a diagram illustrating the trajectory followed by an ion in an ion sensor according to the first embodiment the present disclosure.

FIG. 3 is a diagram illustrating the trajectory followed by an ion in the ion sensor 100 according to the present embodiment.

Figure 4:
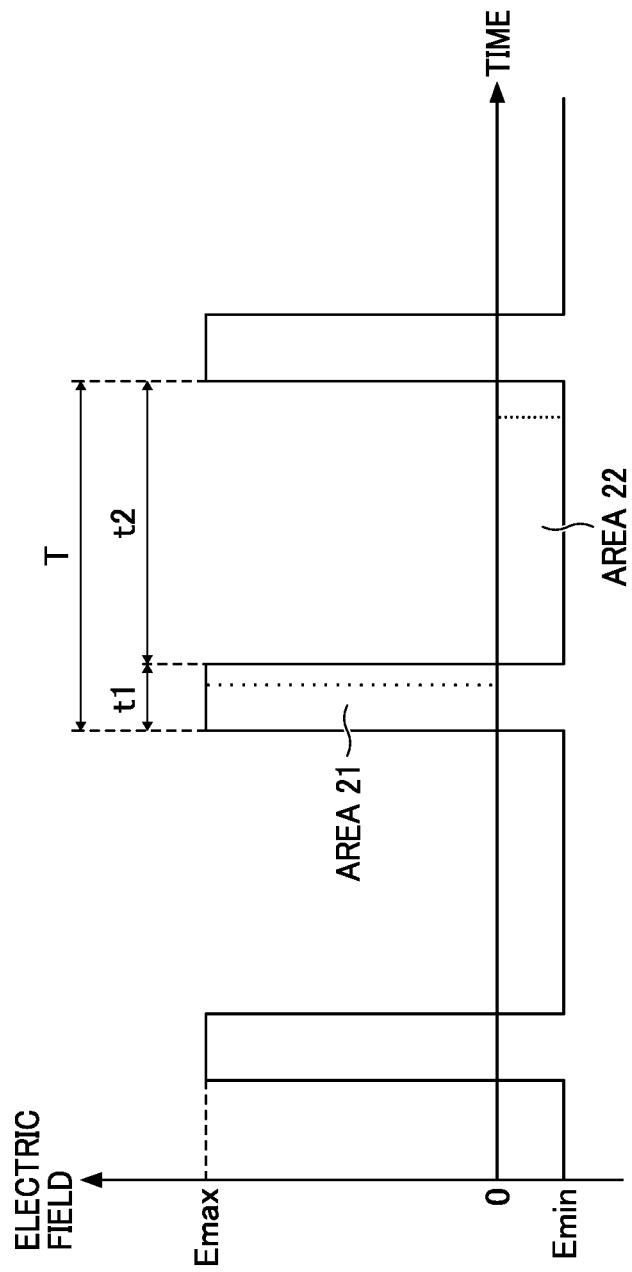
FIG. 4 is a diagram illustrating a waveform of the electric field generated in an ion filter according to an embodiment of the present disclosure.

FIG. 4 is a diagram illustrating a waveform of the electric field generated in the ion filter 110 according to the present embodiment.

The ion sensor 100 is used upon coupling an ion current detector to the ion sensing electrode 120. Electric current is generated according to the amount or number of ions that have collided with the ion sensing electrode 120, and the generated electric current is detected by the ion current detector. In the present embodiment, an XYZ three-dimensional rectangular coordinate system is used, and the direction of travel of a molecule to be measured and the direction in which the first electrode 111 is viewed from the second electrode 112 are referred to as the +Z-direction and +Y-direction, respectively.

Under electric field E environments, ions move at a speed V as expressed in Formula 1 given below. In this formula, K indicates the mobility of the ion.

$$V = K \times E \quad \text{Formula 1}$$

The mobility of an ion has a dependency on the electric field intensity, and this dependency on the electric field intensity varies according to the type of ion. In FIG. 2, the dependency on the electric field intensity of the mobility of three different types of ions (i.e., an ion 11, an ion 12, and an ion 13) are illustrated as an example. For purposes of simplification, FIG. 2 is normalized such that the mobility of a plurality of ions becomes equal to each other when electric field intensity is 0.

There is almost no change in the mobility of the three ions (i.e., the ion 11, the ion 12, and the ion 13) under low electric field intensity environments where the electric field intensity is equal to or lower than 9 kV/cm. As the electric field intensity increases and exceeds about 10 kV/cm, the unique characteristics of each type of ion appears in the mobility. The mobility of the ion 11 significantly increases as the electric field intensity increases, and reaches a peak at a positively high electric field (E max). By contrast, the mobility of the ion 12 increases more gradually than the ion 11, and the mobility of the ion 13 gradually decreases. As described above, each of the three ions is different from the other two in its characteristics. The ion filter 110 sorts the ions using a difference between the mobility under low electric field intensity environments and the mobility under high electric field intensity environments.

FIG. 3 illustrates the trajectories of the three ions (i.e., the ion 11, the ion 12, and the ion 13) between the first electrode 111 and the second electrode 112 of the ion filter 110. For the sake of explanatory convenience, in the present embodiment, the first electrode 111 and the second electrode 112 are illustrated as parallel plates made of a conductive material.

As the waveform of the electric field generated between the first electrode 111 and the second electrode 112 is made asymmetric, it can be configured such that only a desired one of the ions (i.e., the ion 12 in FIG. 3) reaches the ion sensing electrode 120.

In FIG. 4, the waveform of the electric field generated between the first electrode 111 and the second electrode 112 is illustrated. The waveform of an electric field alternates between the positively high electric field (E max) and the negatively low electric field (E min). The length of time (t1) of high electric field is shorter than the length of time (t2) of low electric field, and the ratio of t1 to t2 is between 1:3 and 1:5. As described above, the waveform of an electric field is asymmetric in the up-and-down directions. This asymmetric waveform of an electric field is set such that the time-averaged electric field is at zero and Formula 2 as given below holds true.

|Emax|×t1=|Emin|×t2   Formula 2

In other words, it is configured such that the dimension of an area 21 becomes equal to the dimension of an area 22 as illustrated in FIG. 4.

In the following description, as expressed in Formula 3 given below, it is assumed that the value of |E max|×t1 and the value of |E min|×t2 are β.

|Emax|×t1=|Emin|×t2=β   Formula 3

The speed of ion (Vup) in the Y-axis directions during the time (t1) of high electric field is expressed in Formula 4 given below. In this formula, K(E max) indicates the mobility of the ion when the electric field is at the high electric field (E max).

Vup=K(Emax)×|Emax|   Formula 4

For example, when |E max| is equal to or greater than about 10 kV/cm, the mobility of each one of the three ions (i.e., the ion 11, the ion 12, and the ion 13) is different from the mobility of the other two ions. each of the speeds (Vup) of the three ions is different from the other two. In other words, as illustrated in FIG. 3 during the time (t1) of high electric field the angles of inclination of the trajectories of these three types of ions are different from each other.

The amount of displacement (yup) of an ion in the Y-axis directions during the time (t1) of high electric field is expressed in Formula 5 given below.

yup=Vup×t1   Formula 5

On the other hand, the speed of ion (Vdown) in the Y-axis directions during the time (t2) of low electric field is expressed in Formula 6 given below. In this formula, K(E min) indicates the mobility of the ion when the electric field is at the low electric field (E min).

Vdown=−K(Emin)×|Emin|   Formula 6

For example, when |E min| is equal to or less than about 5 kV/cm, the mobility of the three ions (i.e., the ion 11, the ion 12, and the ion 13) is almost equal to each other. Accordingly, the speed (Vdown) of these three types of ions are almost equal to each other. In other words, as illustrated in FIG. 3, the angles of inclination of the trajectories of these three types of ions are almost equal to each other during the time (t2) of low electric field.

The amount of displacement (ydown) of an ion in the Y-axis directions during the time (t2) of low electric field is expressed in Formula 7 given below.

ydown=Vdown×t2   Formula 7

In one cycle (T) of the asymmetric waveform of an electrical field, the ions move in the +Y direction during the time (t1), and move in the −Y direction during the time (t2), while moving in the +Z direction.

In such a configuration, ions are classified into an ion (e.g., the ion 11) that heads for the first electrode 111 with repeated zigzag motions, an ion (e.g., the ion 13) that heads for the second electrode 112 with repeated zigzag motions, and an ion (e.g., the ion 12) that heads for the ion sensing electrode 120 as the movement in the +Y-direction and the movement in the −Y-direction are balanced with each other, as illustrated in FIG. 3.

The average displacement (ΔyRF) of an ion in the Y-axis directions in one cycle (T) of the asymmetric waveform of an electrical field is expressed in Formula 8 given below.

ΔyRF = yup + ydown =   Formula 8
K(Emax)×|Emax|×t1 − K(Emin)×|Emin|×t2

The above Formula 3 may be applied to the above Formula 8 to obtain Formula 9 given below.

ΔyRF=β{K(Emax)−K(min)}   Formula 9

Assuming that K(E max)−K(min) is equivalent to ΔK in the above Formula 9, the above Formula 9 may be simplified as in Formula 10 given below.

ΔyRF=βΔK   Formula 10

β is a constant determined by the asymmetric electric field generated between the first electrode 111 and the second electrode 112. Accordingly, the displacement of an ion in the Y-axis directions in one cycle (T) of the asymmetric waveform of an electric field depends on the difference ΔK between the mobility under low electric field (E min) environments and the mobility under high electric field (E max) environments.

Assuming that only the carrier gas conveys the ion in the Z-axis direction, the displacement (Y) of that ion in the Y-axis directions while the ion is staying between the first electrode 111 and the second electrode 112 is expressed in Formula 11 given below. In this formula, "tres" indicates average time (average ion staying time) during which the ion stays between the first electrode 111 and the second electrode 112.

$$Y = \frac{\Delta yRF}{(t1+t2)} \times tres = \frac{\beta \Delta K}{T} \times tres$$   Formula 11

The average ion staying time "tres" is expressed in Formula 12 given below. In this formula, "A" indicates the cross-sectional area of the ion path in the ion filter 110, and "L" indicates the length of the electrode (the depth of the electrode) in the Z-axis direction. Moreover, Q indicates the volumetric rate of flow of the carrier gas, and V indicates the capacity (=A×L) of the ion filter 110.

$$tres = \frac{AL}{Q} = \frac{V}{Q}$$   Formula 12

Substitution of the above Formula 12 and Formula 3 into the above Formula 11 yields Formula 13 given below. In this formula, D indicates the duty of the asymmetric waveform of an electrical field, and D=t1/T.

$$Y = \frac{\Delta K \times Emax \times V \times D}{Q}$$   Formula 13

If the same values are used for the high electric field (E max) in the asymmetric waveform of an electric field, the volume (V) of the ion path of the ion filter 110, the duty (D) of the asymmetric waveform of an electric field, and the volumetric rate of flow (Q) of the carrier gas of all kinds of ion, it is understood from the above Formula 13 that the displacement (Y) is proportionate to the difference Δk between the mobility under low electric field (E min) environments unique to the type of ion and the mobility under high electric field (E max) environments unique to the type of ion.

In FIG. 3, the displacement (Y) of the ion 12 is minimum, and only the ion 12 reaches the ion sensing electrode 120. However, no limitation is indicated thereby, and the duty (D) may be altered such that an ion having ΔK different from the ion 12 reaches the ion sensing electrode 120. Further, by altering the duty (D) in small decrements, the presence or the quantity of various kinds of ions with varying ΔK can be detected.

As a method of detecting various kinds of ions with varying ΔK, low-intensity direct-current (DC) electric field may be superimposed on the asymmetric waveform of an electric field by the ion sensor 100. With this method, the amount of displacement in the Y-axis direction can be changed within the time (t1) and the time (t2). Accordingly, the types of ion that can reach the ion sensing electrode 120 without contacting the first electrode 111 or the second electrode 112 can continuously be changed. The DC electric field that is superimposed on the asymmetric waveform of an electric field is referred to as compensation voltages (CV). In this method, the compensation voltages (CV) are swept to detect the presence or the quantity of various kinds of ions with varying ΔK.

The ion that has touched the first electrode 111 or the second electrode 112 before reaching the ion sensing electrode 120 is neutralized and no longer an ion. Thus, such an ion is not detected.

In the ion sensor 100 according to the present embodiment, the solid insulator 130 is disposed between the ion filter 110 and the ion sensing electrode 120. Due to this configuration, even if the distance between the ion filter 110 and the ion sensing electrode 120 is shortened, electric discharge does not easily occur. Accordingly, while avoiding the electric discharge, the ion filter 110 and the ion sensing electrode 120 can be made close to each other to reduce the loss of ion. Accordingly, high detectivity can be achieved. Further, the solid insulator 130 also serves as a positioning unit of the ion filter 110 and the ion sensing electrode 120. Thus, the structural stability can be improved. Moreover, the solid insulator 130 is insusceptible to the atmosphere such as temperature, humidity, and air pressure. Accordingly, compared with the structure in which only air exists between the ion filter 110 and the ion sensing electrode 120, stable operations can be achieved with the present embodiment.

Second Embodiment

A second embodiment of the present disclosure is described below.

Figure 5:
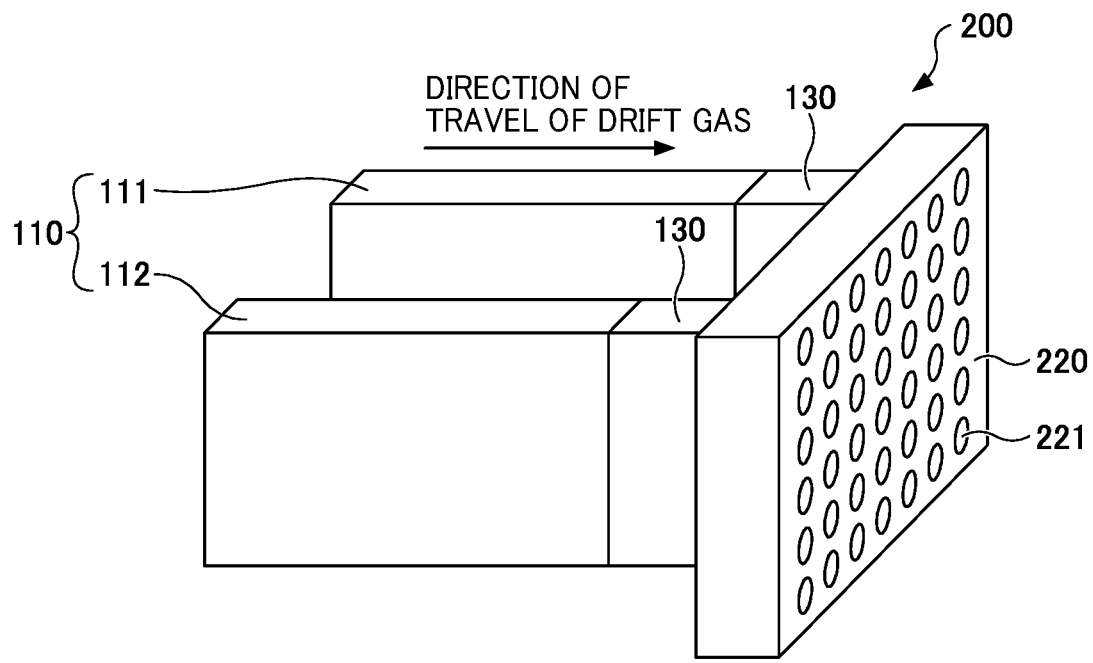
FIG. 5 is a schematic diagram illustrating an ion sensor according to a second embodiment of the present disclosure.

FIG. 5 is a schematic diagram illustrating an ion sensor 200 according to the second embodiment of the present disclosure.

As illustrated in FIG. 5, the ion sensor 200 according to the second embodiment is provided with an ion sensing electrode 220 in place of the ion sensing electrode 120 according to the first embodiment. The ion sensor 200 has slots 221 that extend parallel to the direction of travel of an ion that has passed through the ion filter 110. The other aspects of the configuration according to the present embodiment are equivalent to those of the first embodiment as described above. The direction of travel of an ion that has passed through the ion filter 110 matches the direction of travel of drift gas inside the ion filter 110.

Figure 6:
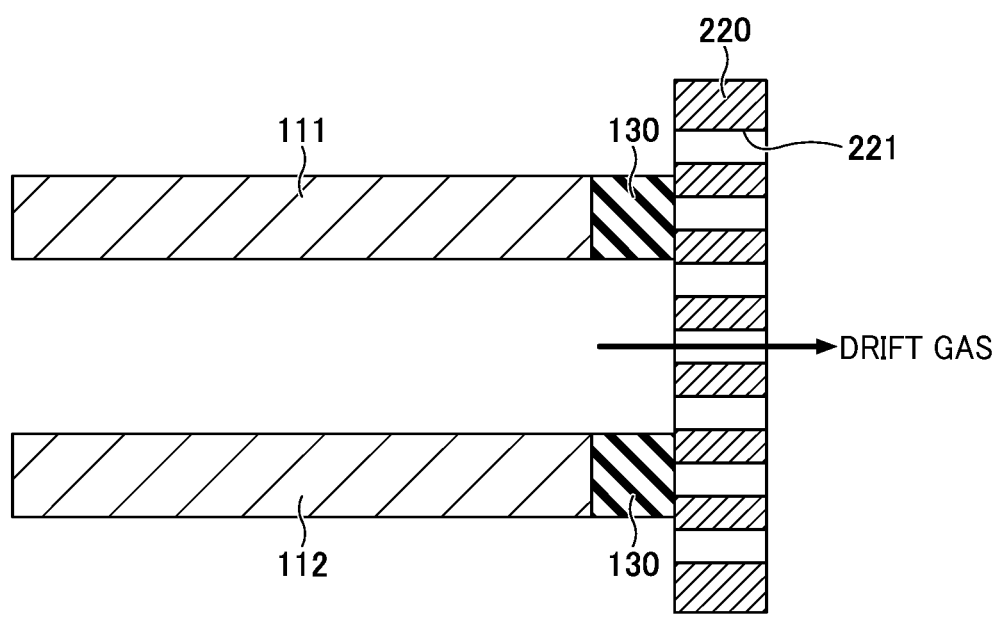
FIG. 6 is a sectional view of the mechanism of the ion sensor according to the second embodiment of the present disclosure.

With the ion sensor 200, advantageous effects similar to those in the ion sensor 100 can be achieved. Further, the ion sensing electrode 220 of the ion sensor 200 has a plurality of slots 221. Accordingly, as illustrated in FIG. 6, the drift gas that has passing through the ion filter 110 can easily pass through the ion sensing electrode 220. Due to this configuration, the loss of ion that is caused by the instabilities of the flow of drift gas can be reduced compared with the configuration according to the first embodiment.

The ion sensing electrode 220 may be made of a porous electrical conducting material. Alternatively, the slots 221 may be formed on the electrically-conductive plate by, for example, micromachining.

Third Embodiment

A third embodiment of the present disclosure is described below.

Figure 7:
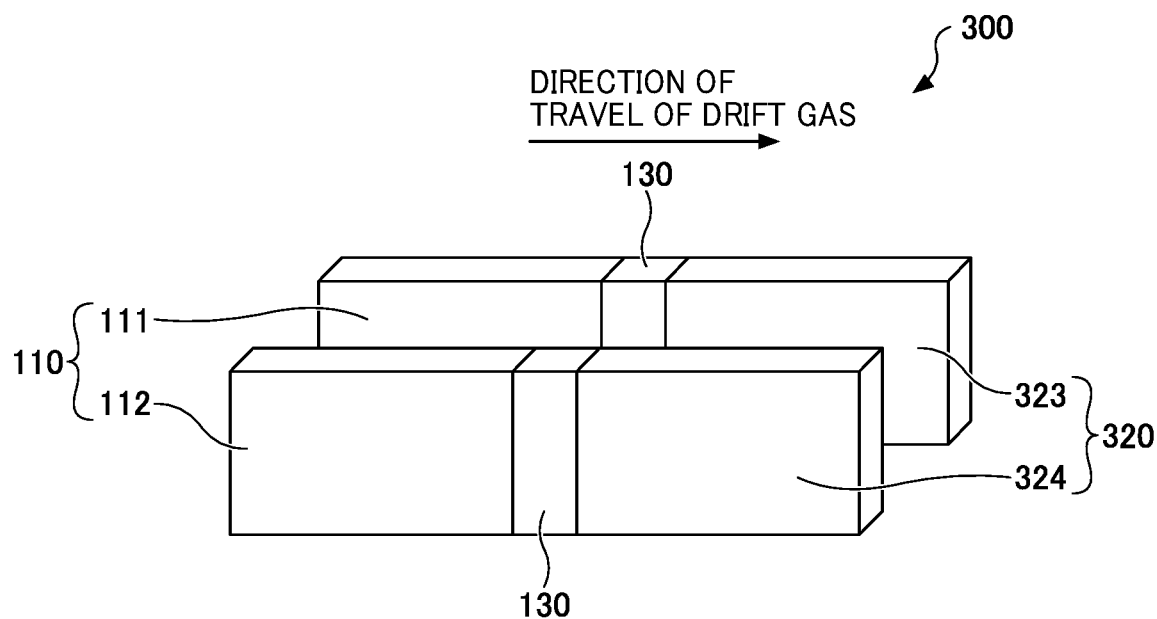
FIG. 7 is a schematic diagram illustrating an on sensor according to a third embodiment of the present disclosure.

FIG. 7 is a schematic diagram illustrating an ion sensor 300 according to the third embodiment of the present disclosure.

As illustrated in FIG. 7, the ion sensor 300 according to the third embodiment is provided with an ion sensing electrode 320 in place of the ion sensing electrode 120 according to the first embodiment. The ion sensing electrode 320 includes a third electrode 323 and a fourth electrode 324 that are electrically insulated from each other. For example, the third electrode 323 and the fourth electrode 324 face each other in a similar manner to the first electrode 111 and the second electrode 112. The third electrode 323 and the fourth electrode 324 are shaped like a plate and parallel to the directions of travel of the ion that has passed through the ion filter 110, and space that is connected to the ion path inside the ion filter 110 exists between the third electrode 323 and the fourth electrode 324. The other aspects of the configuration according to the present embodiment are equivalent to those of the first embodiment as described above. The direction of travel of an ion that has passed through the ion filter 110 matches the direction of travel of drift gas inside the ion filter 110.

The mechanism of the ion sensor 300 is described below.

Figure 8:
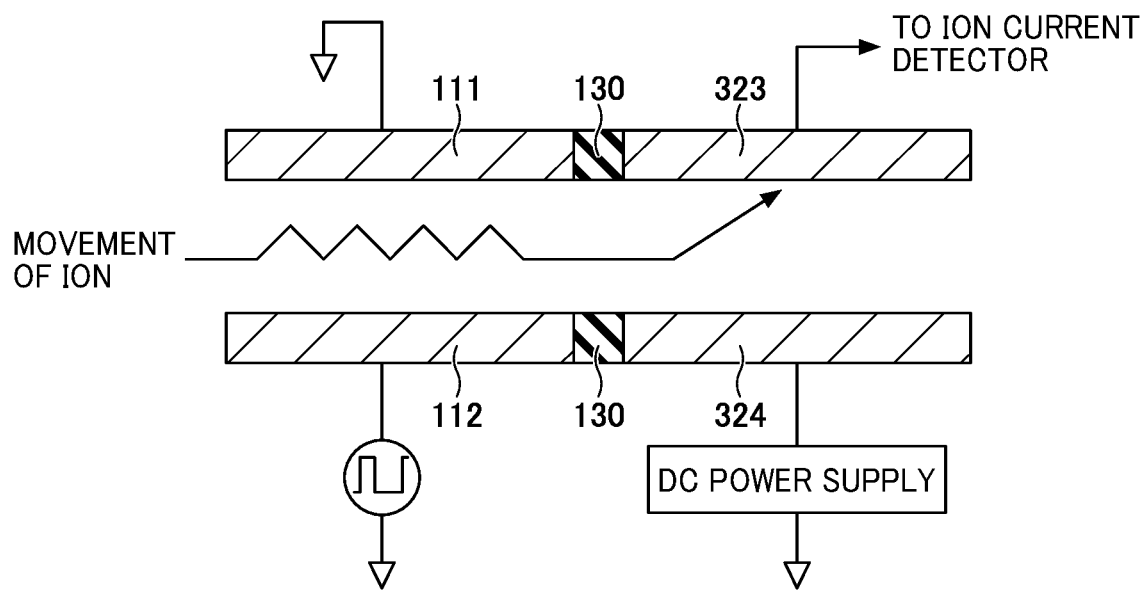
FIG. 8 is a perspective view of the mechanism of the ion sensor according to the third embodiment of the present disclosure.

FIG. 8 is a perspective view of the mechanism of the ion sensor 300 according to the third embodiment of the present disclosure.

An ion current detector is coupled to one of the third electrode 323 and the fourth electrode 324, and a direct-current voltage is applied to the other one of the third electrode 323 and the fourth electrode 324. For example, as illustrated in FIG. 8, an ion current detector is coupled to the third electrode 323, and a direct-current voltage is applied to the fourth electrode 324. In such a configuration, an ion that has reacted to the polarity of the direct-current voltage collides with the third electrode 323, and the electric current that is generated according to the amount or number of ions that have collided with the third electrode 323 is detected by the ion current detector. The other aspects of the configuration according to the present embodiment are equivalent to those of the first embodiment as described above.

With the ion sensor 300, advantageous effects similar to those in the ion sensor 200 can be achieved. Further, with the ion sensor 300 according to the present embodiment the instabilities of drift gas can further be controlled, and the frequency of collision of ions with the ion sensing electrode 320 improves by applying direct-current voltage to the ion sensing electrode 320. Accordingly, the efficiency of detection further improves. Moreover, the ions to be detected can be selected according to the polarity of direct-current voltage.

Fourth Embodiment

A fourth embodiment of the present disclosure is described below.

Figure 9A:
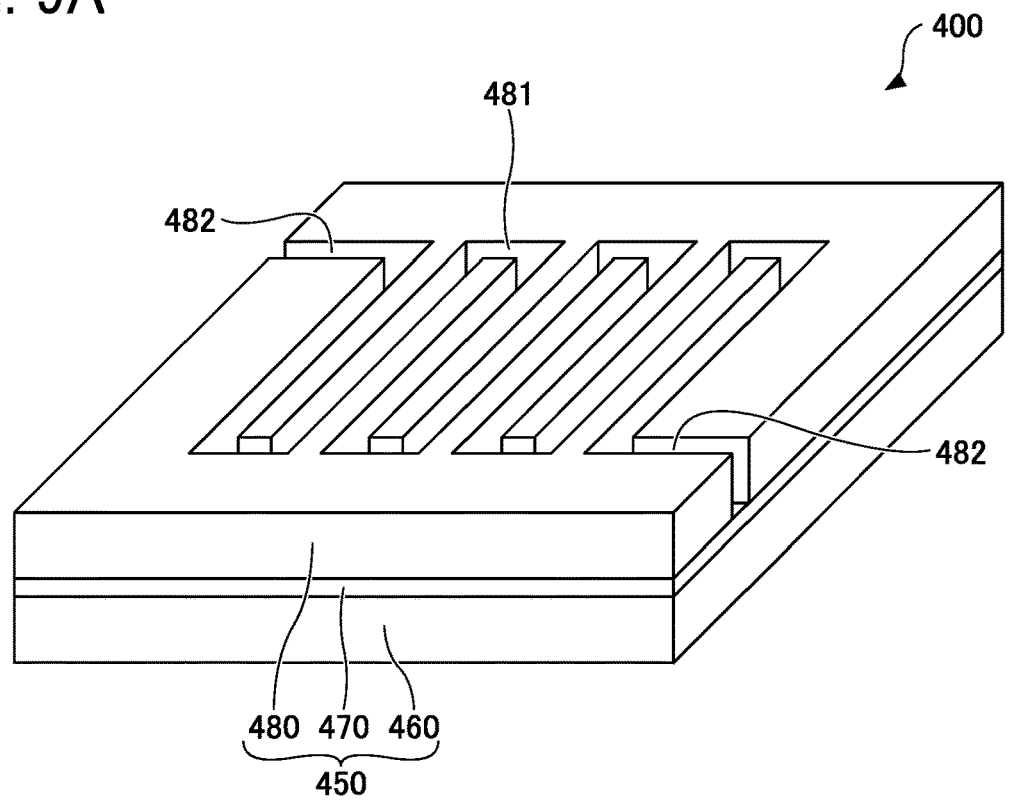
FIG. 9A and FIG. 9B are a perspective view and top view of an ion sensor according to a fourth embodiment of the present disclosure.
Figure 9B:
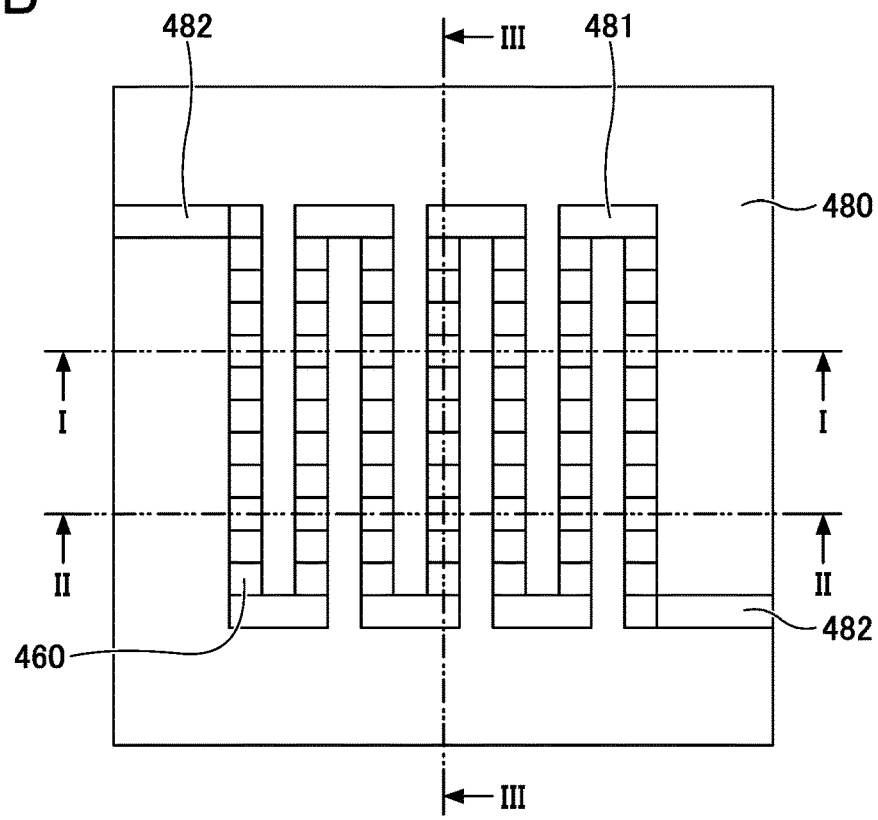

FIG. 9A and FIG. 9B are a perspective view and top view of an ion sensor 400, respectively, according to the fourth embodiment of the present disclosure.

Figure 10:
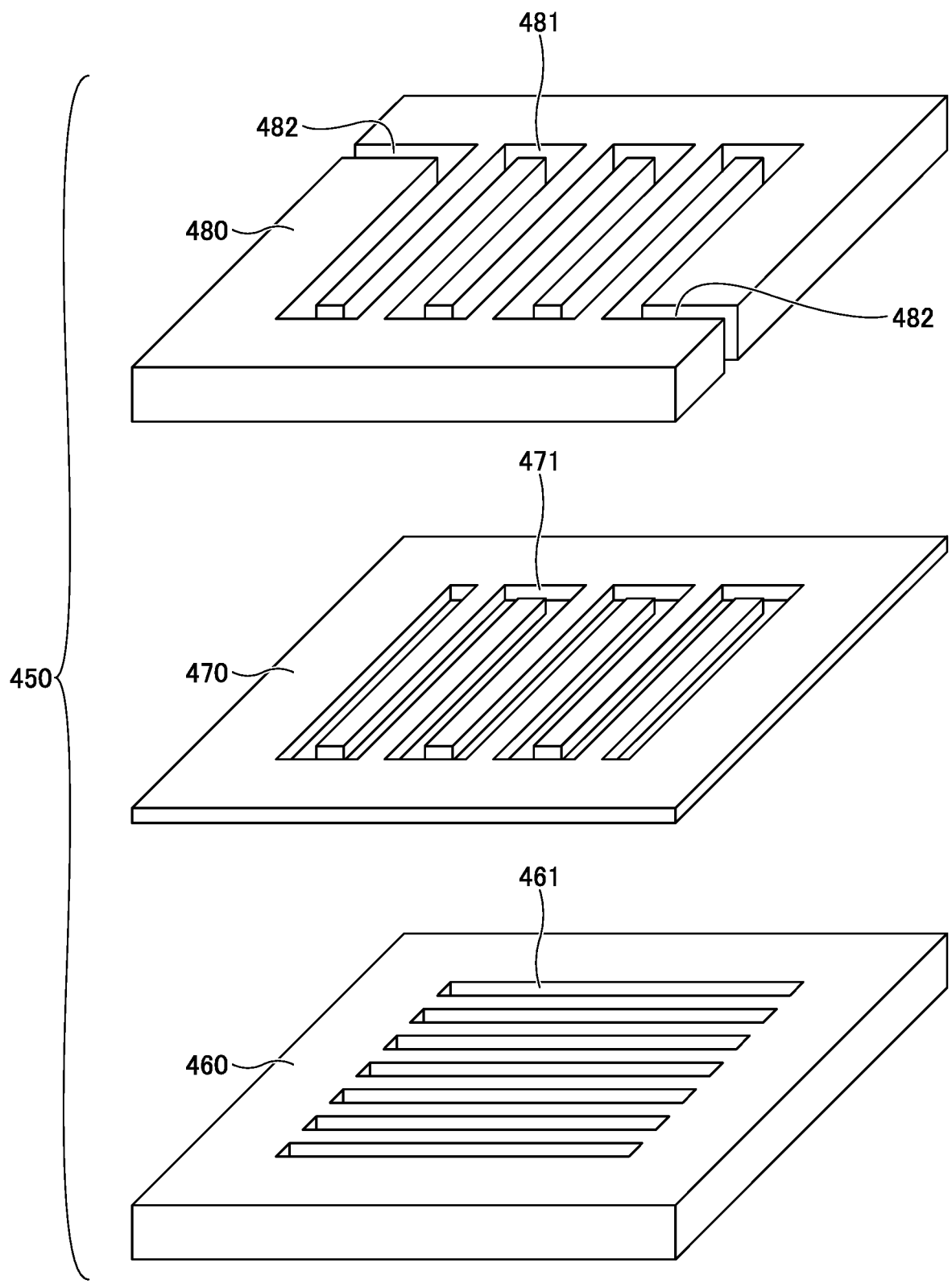
FIG. 10 is an exploded perspective view of the ion sensor according to the fourth embodiment of the present disclosure.

FIG. 10 is an exploded perspective view of the ion sensor 400 according to the fourth embodiment of the present disclosure.

Figure 11A:
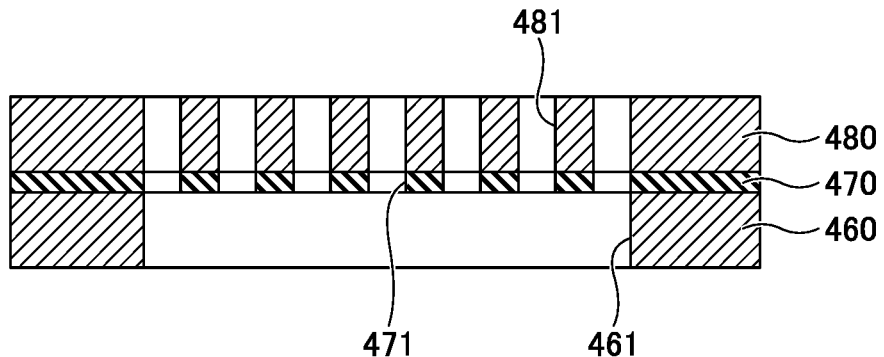
FIG. 11A, FIG. 11B, and FIG. 11C are sectional views of the ion sensor according to the fourth embodiment of the present disclosure.
Figure 11B:
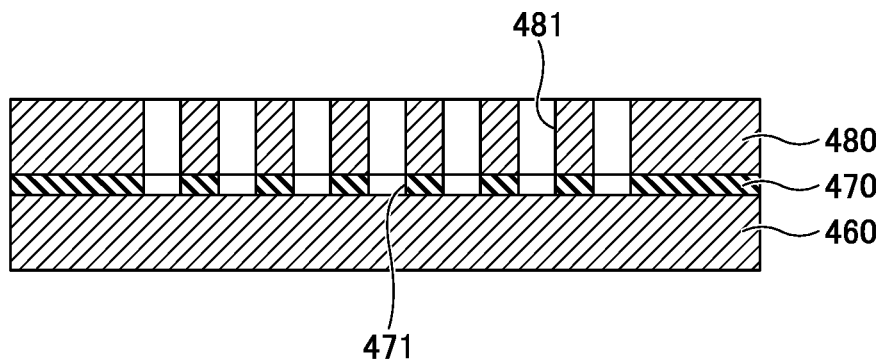
Figure 11C:
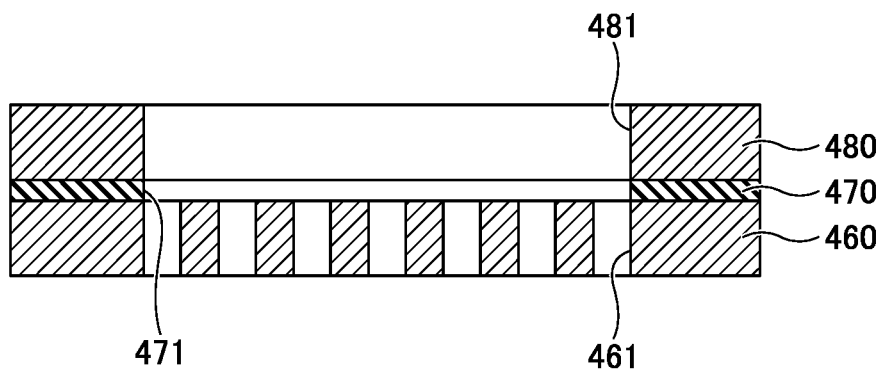

FIG. 11A, FIG. 11B, and FIG. 11C are sectional views of the ion sensor 400 along lines I-I, II-II, and III-III, respectively, as illustrated in FIG. 9B.

As illustrated in FIG. 9A, FIG. 9B, FIG. 10, FIG. 11A, FIG. 11B, and FIG. 11C, the ion sensor 400 according to the fourth embodiment is provided with a silicon on insulator (SOI) substrate 450. For example, the SOI substrate 450 includes an electrically conductive base layer 460 made of Si, an insulating layer 470 made of $SiO_2$ disposed on the base layer 460, and an electrically conductive active layer 480 made of Si and disposed on the insulating layer 470. A plurality of rectangular slits 461 are formed parallel to each other in the center of the base layer 460, and a serpentine slit 471 that meanders in a planar view is formed in the center of the insulating layer 470. Moreover, a serpentine slit 481 that meanders in a planar view is formed in the center of the active layer 480. In other words, both the insulating layer 470 and the active layer 480 have a comb-like pattern in the center, and the tooth portions of such a comb-like pattern turn near the edges and extend parallel to each other. The slit 471 and the slit 481 meander so as to cross the slits 461. The base layer 460 is an example of an ion sensing electrode, and the insulating layer 470 is an example of an insulator. The active layer 480 is an example of an ion filter. Two trenches 482 that are connected to the slit 481 are formed in the active layer 480, and the active layer 480 is divided into two by the slit 481 and the trenches 482. One of the divided active layer 480 is an example of the first electrode, and the other one of the divided active layer 480 is an example of the second electrode.

The mechanism of the ion sensor 400 is described below.

Figure 12:
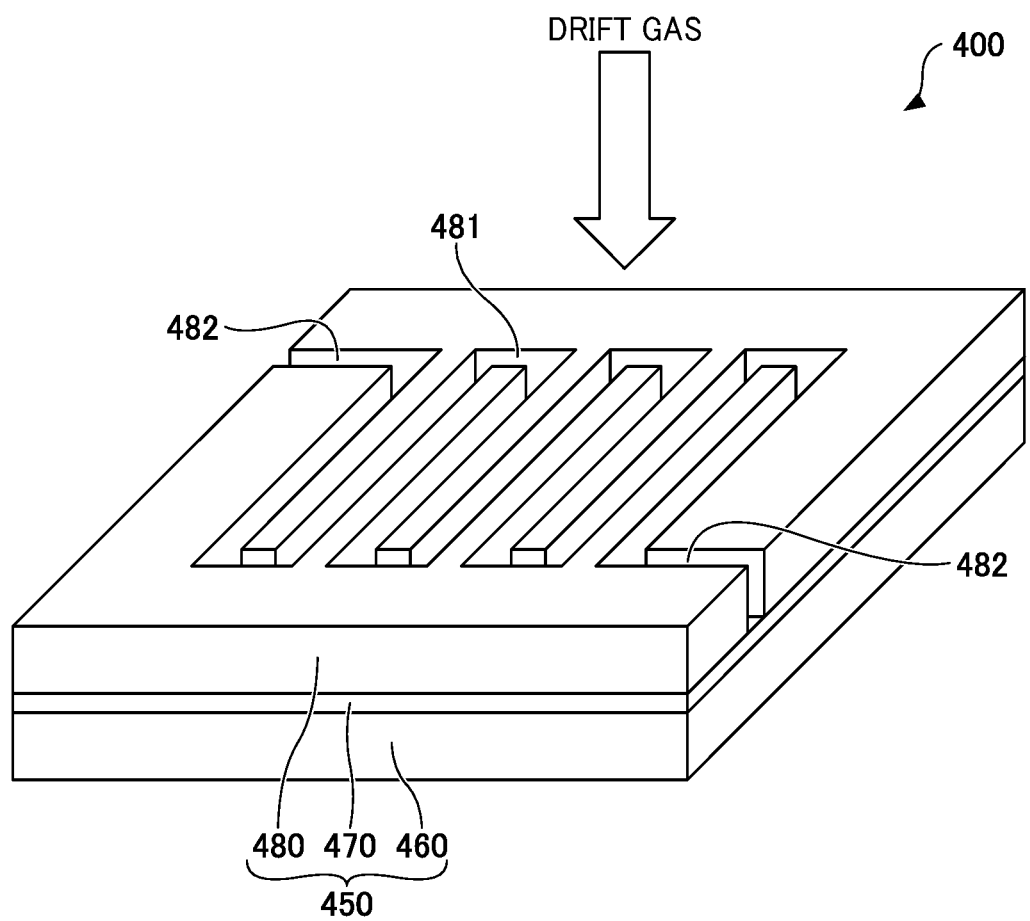
FIG. 12 is a perspective view of the mechanism of the ion sensor according to the fourth embodiment of the present disclosure.

FIG. 12 is a perspective view of the mechanism of the ion sensor 400 according to the fourth embodiment of the present disclosure.

For example, as illustrated in FIG. 12, the electrical potential of the second electrode is electrically connected to the ground potential, and an asymmetric alternating-current signal source is coupled to the first electrode. Moreover, an ion current detector is coupled to the base layer 460. Drift gas including ions is conducted into the slit 481 of the active layer 480 from above. Due to this configuration, the ions included in the drift gas are sorted as those ions pass through the slit 481. Then, electric current is generated according to the amount or number of ions that have collided with the base layer 460, and the generated electric current is detected by the ion current detector.

The manufacturing process of the ion sensor 400 is described below.

FIG. 13A, FIG. 13B, FIG. 13C, and FIG. 13D are sectional views of how the ion sensor 400 is manufactured in steps in the chronological order, according to the fourth embodiments of the present disclosure.

In a similar manner to FIG. 11A, cross-sectional views along line I-I of FIG. 9B are illustrated in FIG. 13A, FIG. 13B, FIG. 13C, and FIG. 13D.

Figure 13A:
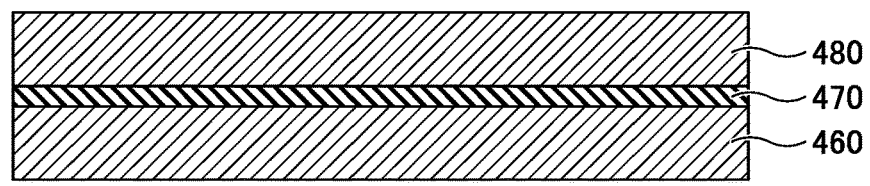
FIG. 13A, FIG. 13B, FIG. 13C, and FIG. 13D are sectional views of how an ion sensor is manufactured in steps in the chronological order, according to the fourth embodiments of the present disclosure.
Figure 13B:
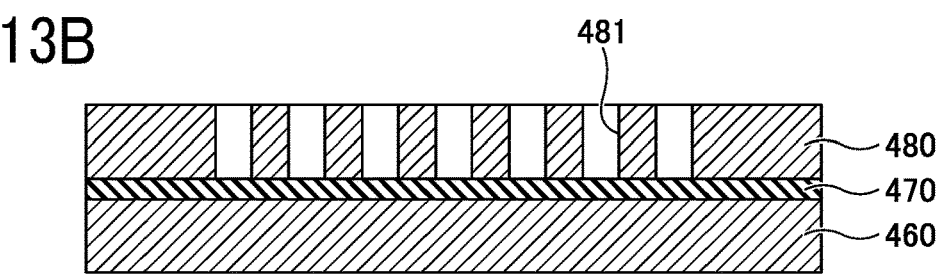
Figure 13C:
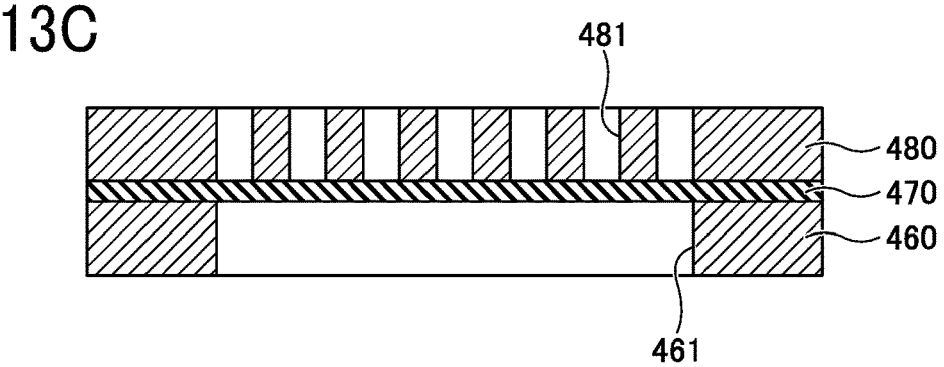
Figure 13D:
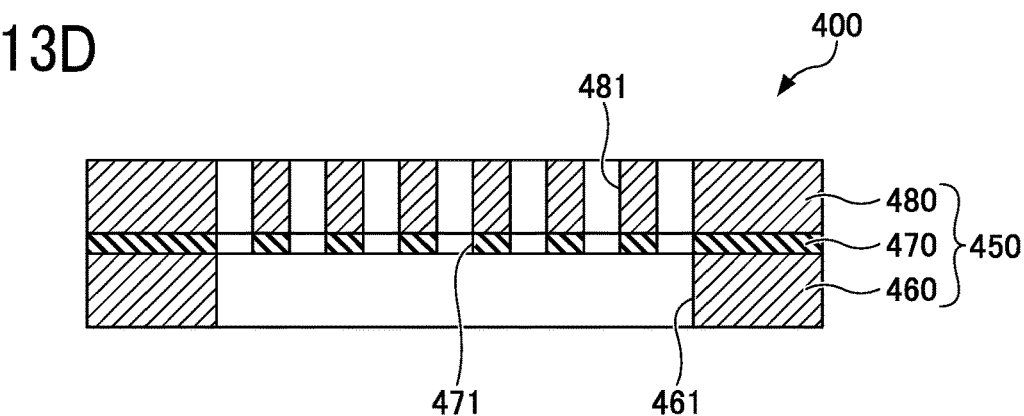

First of all, as illustrated in FIG. 13A, a silicon on insulator (SOI) substrate including the base layer 460, the insulating layer 470, and the active layer 480 is prepared. Secondly, as illustrated in FIG. 13B, the active layer 480 is etched to form the slit 481 (corresponding to the first slit). Subsequently, as illustrated in FIG. 13C, the base layer 460 is etched to form the slits 461 (corresponding to the second slit). Then, as illustrated in FIG. 13D, the insulating layer 470 is etched to form slit 471 (corresponding to the third slit). The ion sensor 400 according to the present embodiment is manufactured as described above.

With this method according to the present embodiment, downsized ion sensors can easily be manufactured with a high degree of precision. In other words, in methods where an ion filter, an insulator, and an ion sensing electrode are separately prepared and these elements are combined later, it is difficult to maintain the precision of alignment at a high level when downsized elements are combined. In particular, when the thickness of the insulator is reduced in order to shorten the distance between the ion filter and the ion sensing electrode, the handleability of the insulator deteriorates, and the alignment tends to be difficult. In factuality, etching for SOI substrates, which is adopted in methods of manufacturing semiconductor devices or the like, is performed in order to handle the above situation. For example, it is not necessary to handle the insulating layer 470 independently in such etching, and thus alignment can be performed with a high degree of precision.

Note that the order in which the slits are formed is not limited to that of the present embodiment described as above. For example, the slit 481 may be formed after the slits 461 are formed.

In the fourth embodiment, it is not always necessary for the pattern of the insulating layer 470 to be consistent with the pattern of the active layer 480. Instead, the pattern of the insulating layer 470 may be consistent with the pattern of the base layer 460.

Note also that the size of the ion sensor 400 is not limited. For example, the thickness of the SOI substrate 450 is between 0.2 millimeters (mm) to 0.4 mm, and the planar shape of the SOI substrate 450 is a rectangle whose length of one side is between 3.0 mm to 7.0 mm. Moreover, the area in which the slit 481 is formed is a rectangular region whose length of one side is between 2.0 mm to 3.0 mm, and the width of the slit 481 is between 0.030 mm to 0.040 mm.

Fifth Embodiment

A fifth embodiment of the present disclosure is described below.

Figure 14A:
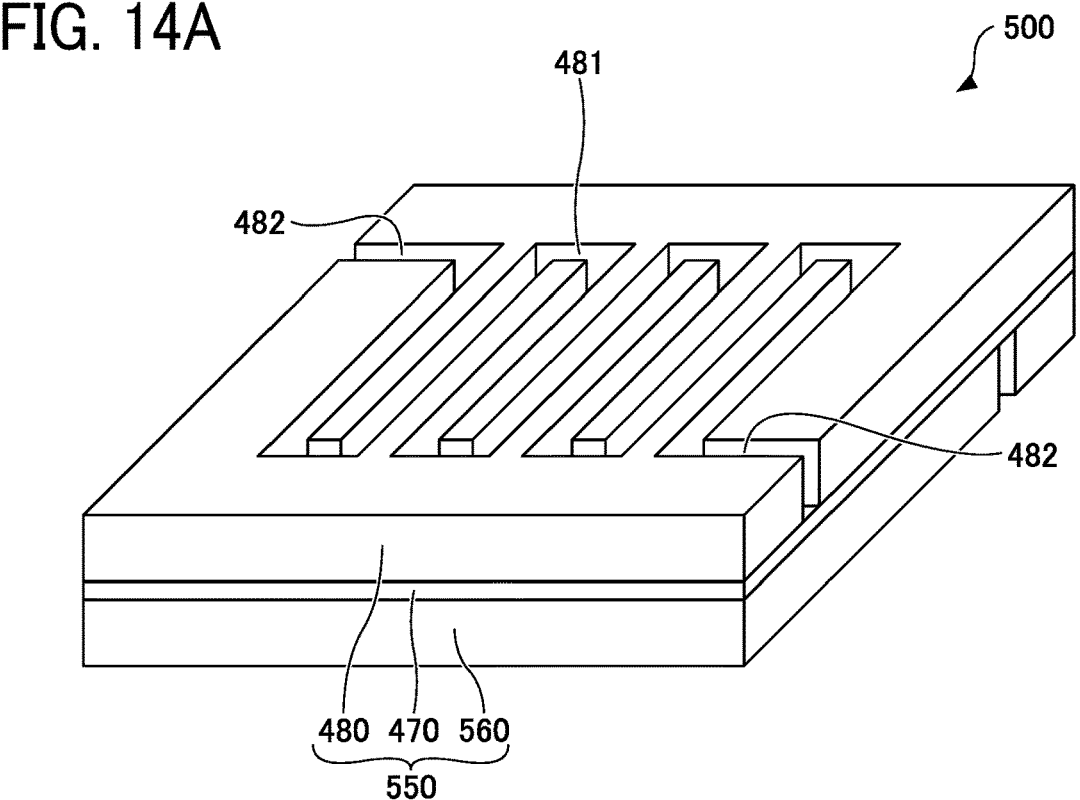
FIG. 14A and FIG. 14B are a perspective view and top view of an ion sensor according to a fifth embodiment of the present disclosure.
Figure 14B:
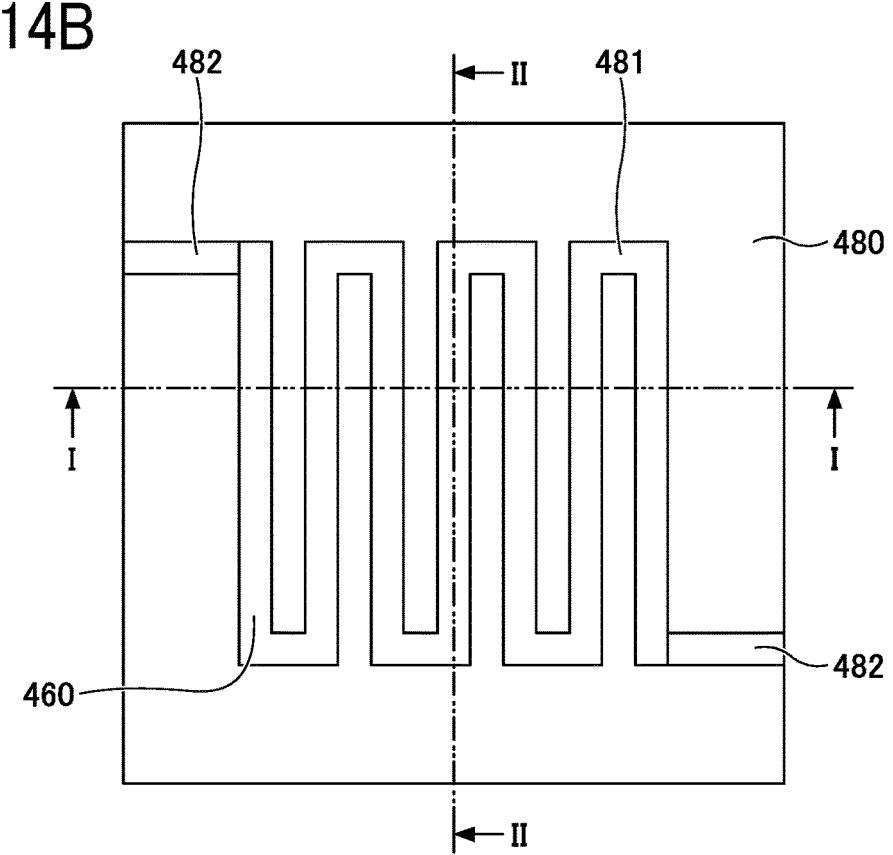

FIG. 14A and FIG. 14B are a perspective view and top view of an ion sensor 500, respectively, according to the fifth embodiment of the present disclosure.

Figure 15:
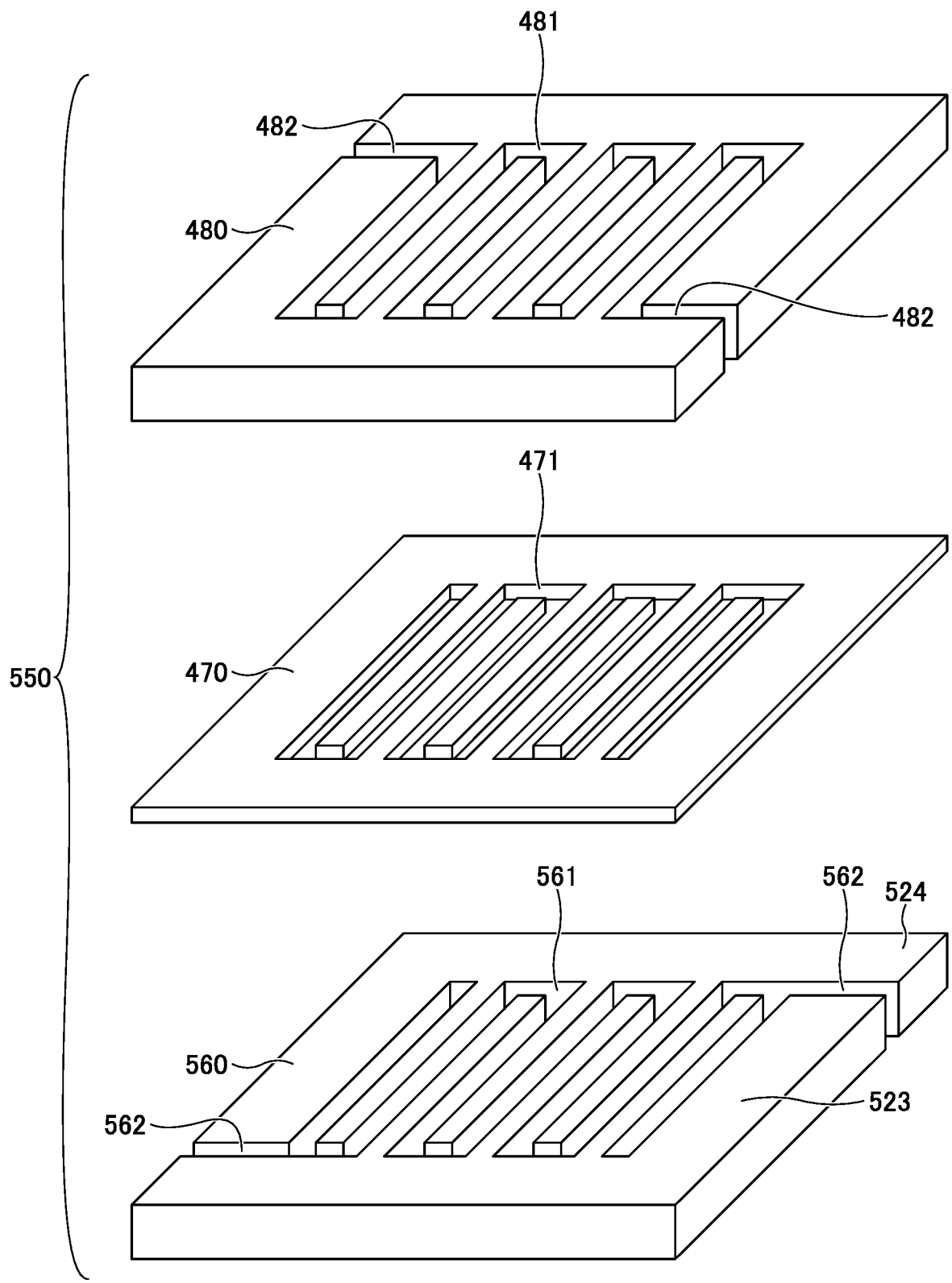
FIG. 15 is an exploded perspective view of the ion sensor according to the fifth embodiment of the present disclosure.

FIG. 15 is an exploded perspective view of the ion sensor 500 according to the fifth embodiment of the present disclosure.

Figure 16A:
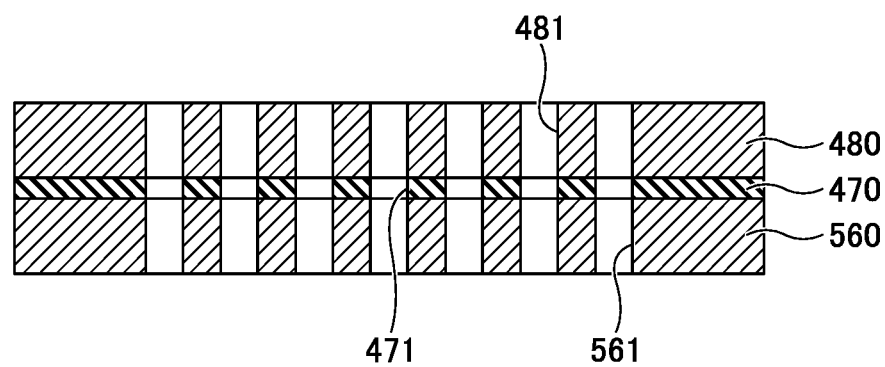
FIG. 16A and FIG. 16B are sectional views of the ion sensor according to the fifth embodiment of the present disclosure.
Figure 16B:
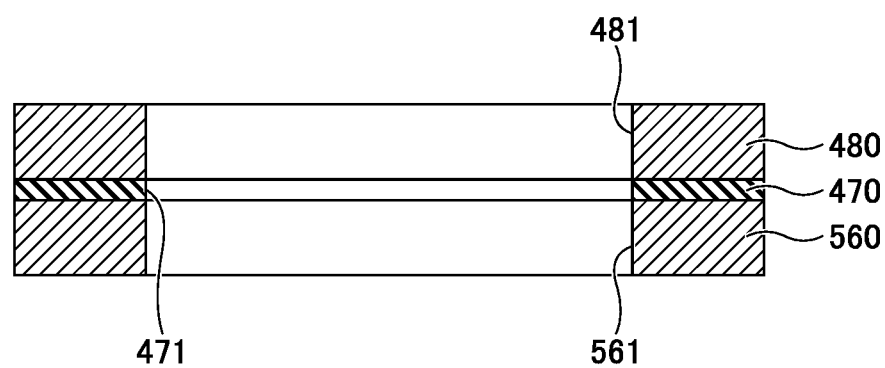

FIG. 16A and FIG. 16B are sectional views of the ion sensor 500 along lines I-I and II-II, respectively, as illustrated in FIG. 14B.

As illustrated in FIG. 14A, FIG. 14B, FIG. 15, FIG. 16A, FIG. 16B the ion sensor 500 according to the fifth embodiment is provided with a silicon on insulator (SOI) substrate 550, and the SOI substrate 550 includes an electrically conductive base layer 560 made of Si in place of the base layer 460 according to the fourth embodiment. A serpentine slit 561 that meanders in a planar view is formed in the center of the base layer 560. In other words, the base layer 560 has a comb-like pattern in the center, and the tooth portions of such a comb-like pattern turn near the edges and extend parallel to each other. The arrangement of the slit 561 is consistent with the slit 471 and the slit 481. In other words, the arrangements of the slit 561, the slit 471, and the slit 481 overlap with each other in a planar view. The base layer 560 is an example of an ion sensing electrode. Two trenches 562 that are connected to the slit 561 are formed in the base layer 560, and the base layer 560 is divided into two by the slit 561 and the trenches 562. One of the divided base layer 560 is used as a third electrode 523, and the other one of the divided base layer 560 is used as a fourth electrode 524.

Figure 17:
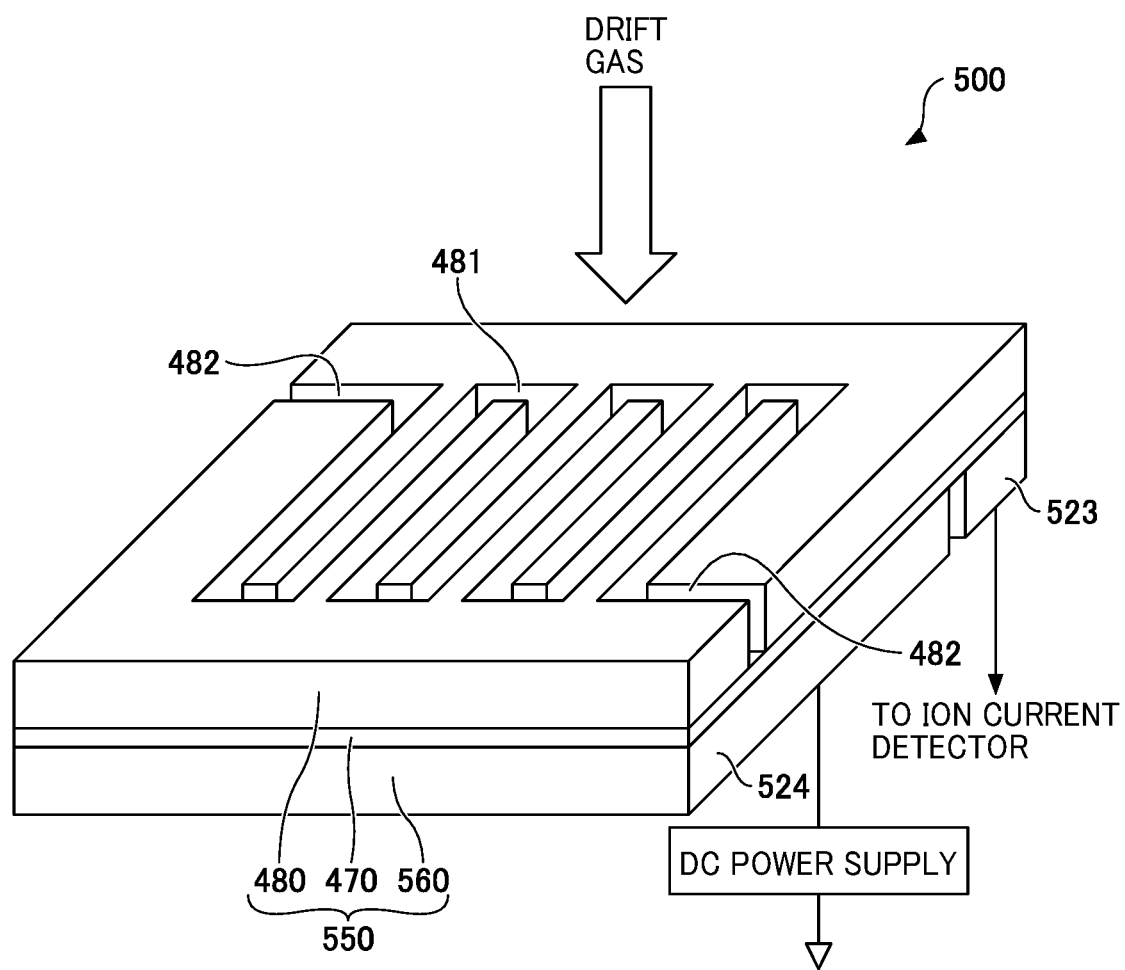
FIG. 17 is a perspective view of the mechanism of the ion sensor according to the fifth embodiment of the present disclosure.

The mechanism of the ion sensor 500 is described below. FIG. 17 is a perspective view of the mechanism of the ion sensor 500 according to the fifth embodiment of the present disclosure. Direct-current voltage is applied to one of a third electrode 523 and a fourth electrode 524, and an ion current detector is coupled to the other one of the third electrode 523 and the fourth electrode 524. For example, as illustrated in FIG. 17, direct-current voltage (bias voltage) is applied to the third electrode 523, and an ion current detector is coupled to the fourth electrode 524. In such a configuration, an ion that has reacted to the polarity of the direct-current voltage collides with the fourth electrode 524, and the electric current that is generated according to the amount or number of ions that have collided with the fourth electrode 524 is detected by the ion current detector. The other aspects of the configuration according to the present embodiment are equivalent to those of the fourth embodiment as described above.

With the ion sensor 500 according to the present embodiment, advantageous effects similar to those in the ion sensor 400 can be achieved. Further, with the ion sensor 500 according to the present embodiment, the instabilities of drift gas can further be controlled, and direct-current voltage (bias) may be applied to the base layer 560 that serves as an ion sensing electrode such that ions are more likely to collide with the base layer 560. Accordingly, the efficiency of ion detection further improves. Moreover, the ions to be detected can be selected according to the polarity of direct-current voltage.

In a planar view, it is desired that the position of the trench 562 be displaced from the position of the trench 482. If the position of the trench 562 and the position of the trench 482 overlap each other, only the insulating layer 470 exists at such an overlapping region in a planar view, and this may result in a reduction of the strength of the ion sensor 500.

When the ion sensor 500 is to be manufactured, it is desired that the etching pattern of the base layer 560 be changed using a method similar to the method of manufacturing the ion sensor 400.

Figure 18:
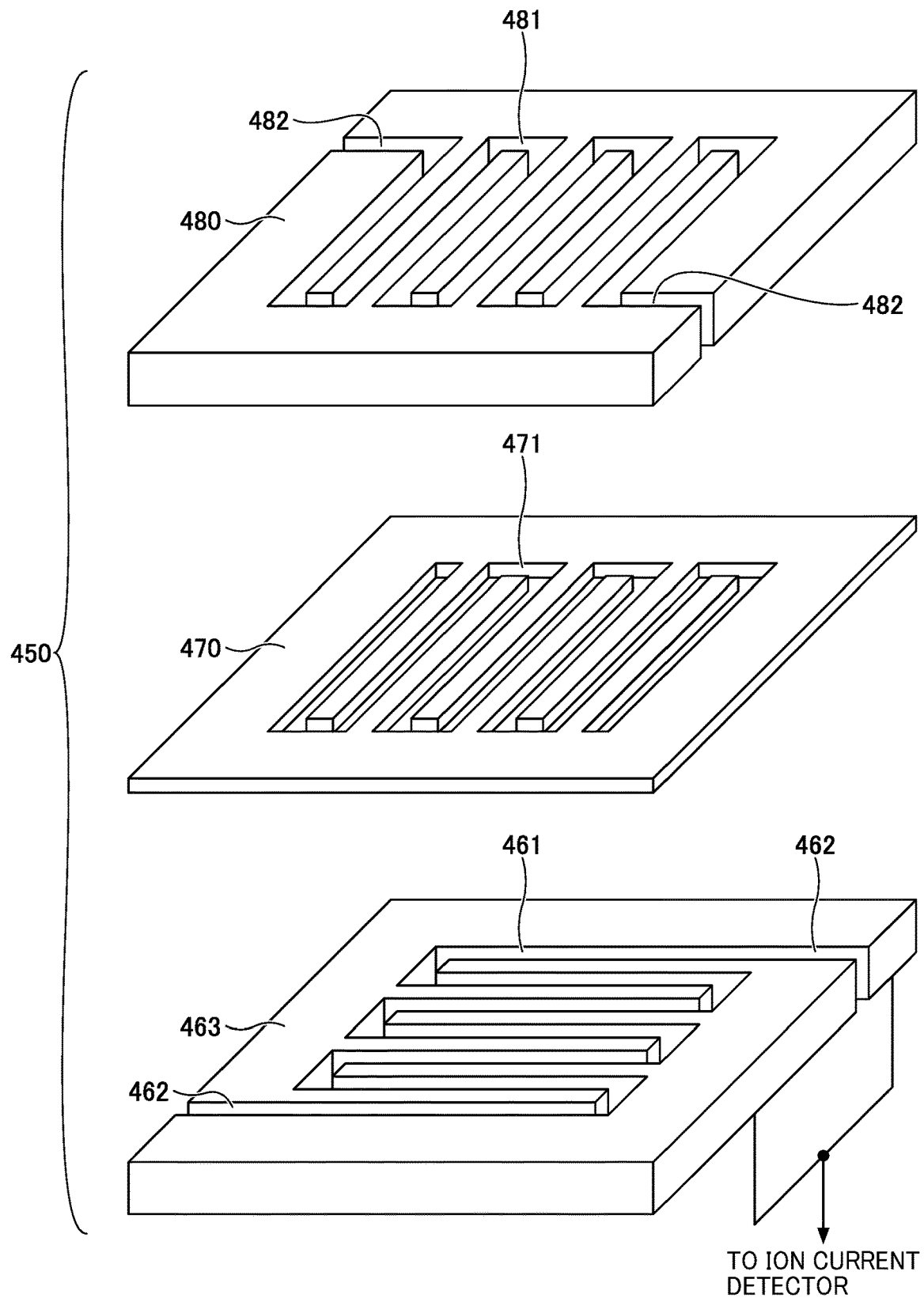
FIG. 18 is a perspective view of an ion sensor according to a modification of the fourth embodiment of the present disclosure.

In the fourth embodiment, the slits 461 may be connected to each other and may meander in a planar view in a similar manner to the slit 561. Further, as illustrated in FIG. 18, two trenches 462 may be formed at the ends of the slit 461 that meanders in a planar view in a similar manner to the trenches 562, and two parts of base layer 463 that are obtained by dividing the base layer 460 into two may be used in place of the base layer 460. In such a configuration, an ion current detector is coupled to both of the two parts of base layer 463.

Sixth Embodiment

A sixth embodiment of the present disclosure is described below.

Figure 19A:
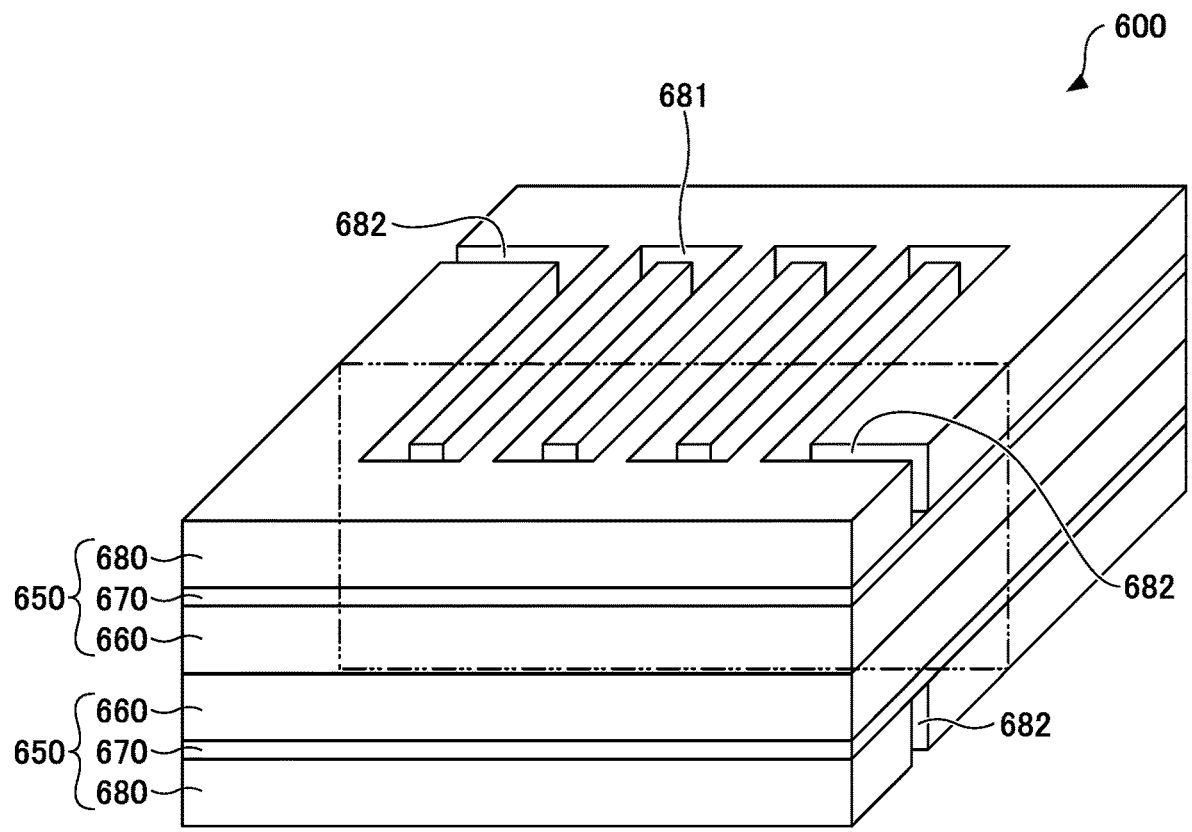
FIG. 19A and FIG. 19B are a perspective view and sectional view of an ion sensor according to a sixth embodiment of the present disclosure.
Figure 19B:
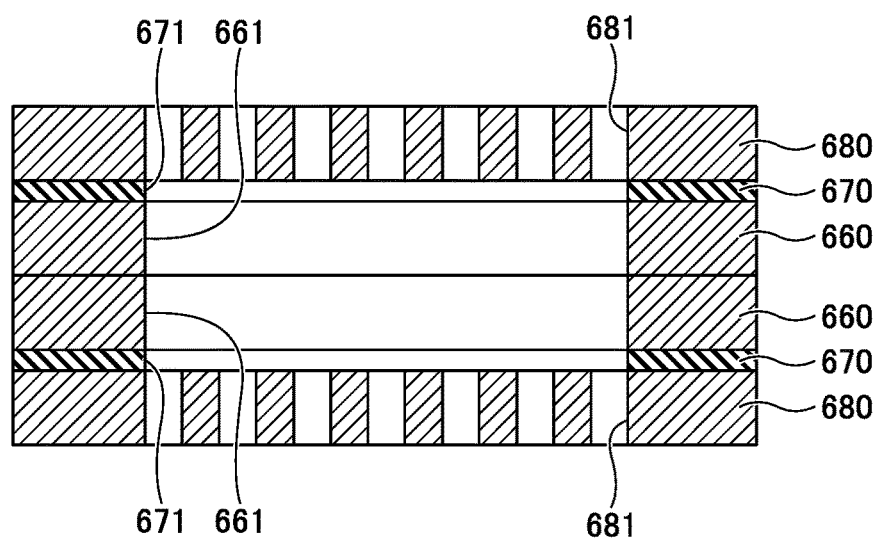

FIG. 19A and FIG. 19B are a perspective view and sectional view of an ion sensor 600, respectively, according to the sixth embodiment of the present disclosure.

Figure 20:
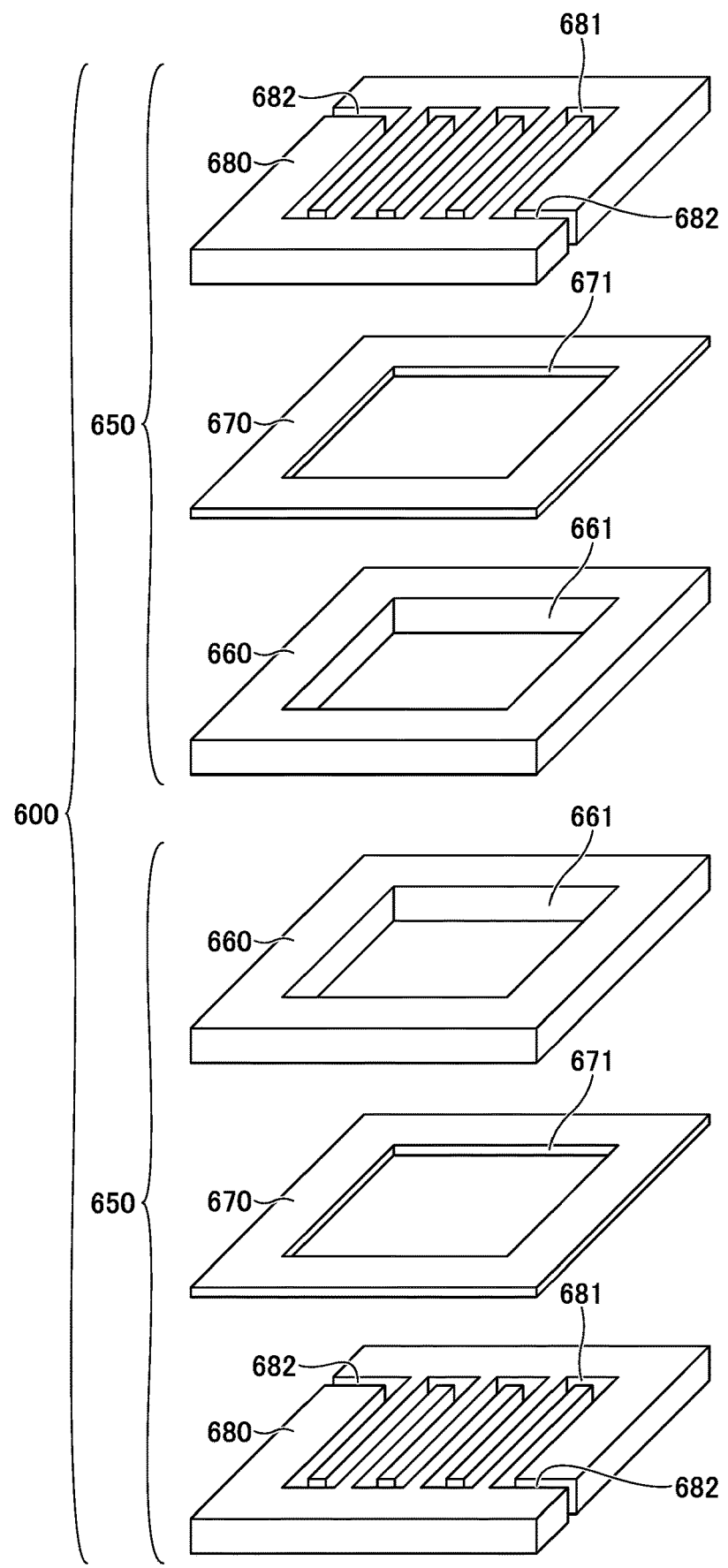
FIG. 20 is an exploded perspective view of the ion sensor according to the sixth embodiment of the present disclosure.

FIG. 20 is an exploded perspective view of the ion sensor 600 according to the sixth embodiment of the present disclosure.

FIG. 19B illustrates the sectional view indicated by the two-dot chain line as illustrated in FIG. 19A.

As illustrated in FIG. 19A, FIG. 19B, and FIG. 20, the ion sensor 600 according to the sixth embodiment has two silicon on insulator (SOI) substrates 650. For example, the SOI substrate 650 includes an electrically conductive base layer 660 made of Si, an insulating layer 670 made of $SiO_2$ disposed on the base layer 660, and an electrically conductive active layer 680 made of Si and disposed on the insulating layer 670. A serpentine slit 681 that meanders in a planar view is formed in the center of the active layer 680. In other words, the active layer 680 has a comb-like pattern in the center, and the tooth portions of such a comb-like pattern turn near the edges and extend parallel to each other. In the center of the base layer 660, a slit 661 is formed so as to encompass the slit 681 in a planar view. In the center of the insulating layer 670, a slit 671 that is consistent with the slit 661 is formed. Two trenches 682 that are connected to the slit 681 are formed in the active layer 680, and the active layer 680 is divided into two by the slit 681 and the trenches 682.

The base layers 660 of the respective two SOI substrates 650 are bonded together so as to face each other, and the arrangements of the slits 681 of those SOI substrates 650 overlap with each other in a planar view. Moreover, the arrangements of the slits 661 and the slits 671 of those SOI substrates 650 overlap with each other in a planar view. Once of the two active layers 680 is an example of an ion sensing electrode, and the other one of the two active layers 680 is an example of an ion filter. Moreover, a layered product of the insulating layer 670 and the base layer 660 is an example of an insulator. One of the divided active layers 680 that corresponds to an ion filter is an example of the first electrode, and the other one of the divided active layer 680 is an example of the second electrode. One of the divided active layers 680 that corresponds to an ion sensing electrode is an example of the third electrode, and the other one of the divided active layer 680 is an example of the fourth electrode.

With the ion sensor 600 according to the sixth modification, advantageous effects similar to those of the fifth embodiment as described above can be achieved.

When the ion sensor 600 according to the present embodiment is manufactured, the slit 681, the slit 661, and the slit 671 are formed by etching a prepared silicon on insulator (SOI) wafer, and the SOI wafer is divided into several pieces. By so doing, a plurality of SOI substrates 650 can be produced. Subsequently, two SOI substrates 650 are bonded together to obtain the ion sensor 600.

As described above, the base layer 660 and the insulating layer 670 can easily be manufactured compared with the slit 681 in order to manufacture the ion sensor 600 according to the present embodiment. Accordingly, it is easier to manufacture an ion sensor compared with the fifth embodiments of the present disclosure. Typically, as the pattern is sparser, higher etching rate can be achieved. Accordingly, the slit 661 can be formed in a short time.

It is desired that the thickness of the base layer 660 be reduced by polishing or the like after the slit 681 is formed and before the slit 661 is formed. Due to such thinning, the distance between the two active layers 680 is reduced and the loss of ion can further be reduced.

Seventh Embodiment

A seventh embodiment of the present disclosure is described below.

Figure 21A:
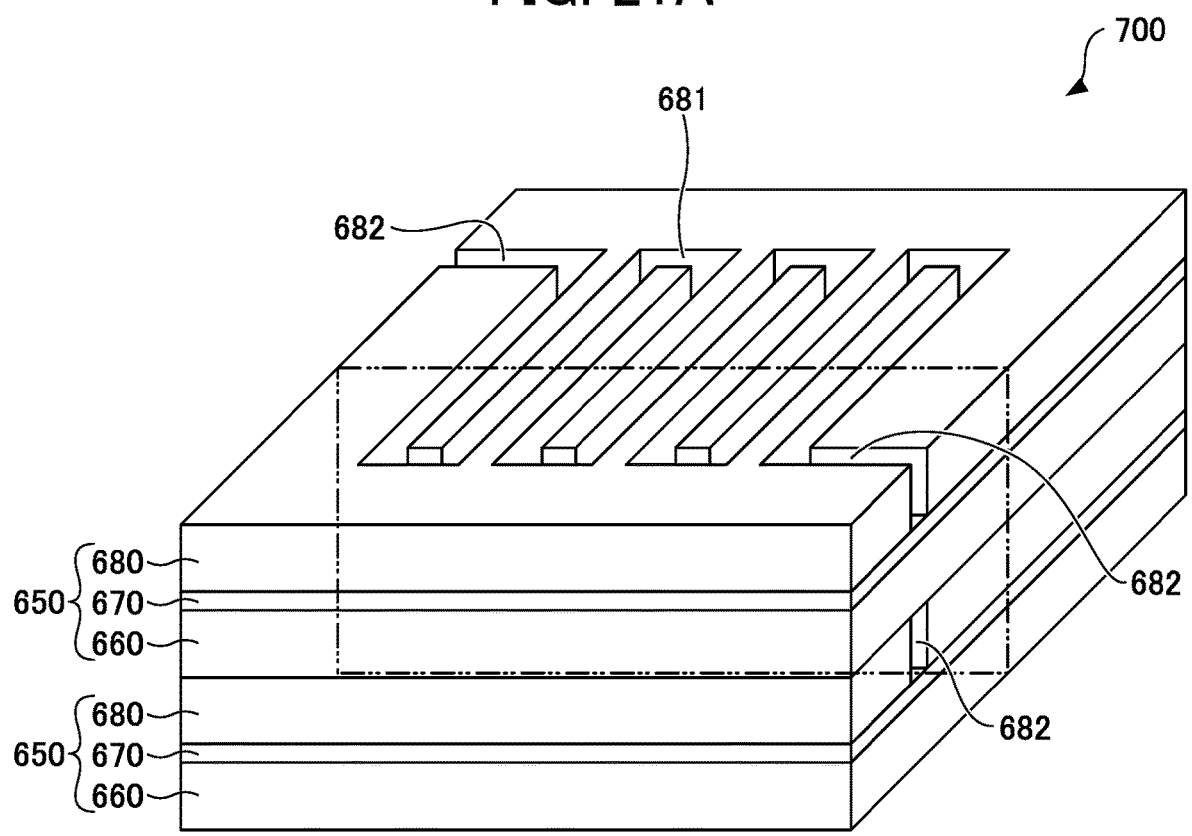
FIG. 21A and FIG. 21B are a perspective view and sectional view of an ion sensor according to a seventh embodiment of the present disclosure.
Figure 21B:
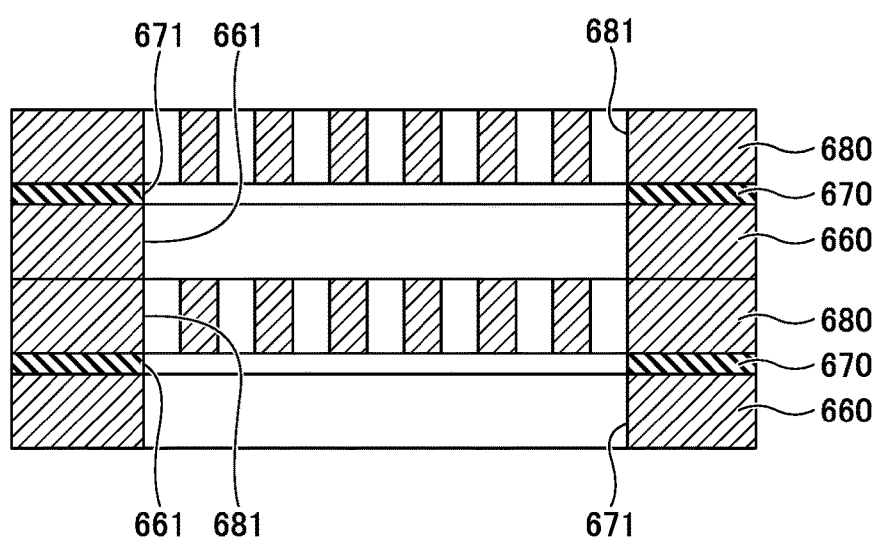

FIG. 21A and FIG. 21B are a perspective view and sectional view of an ion sensor 700, respectively, according to the seventh embodiment of the present disclosure.

Figure 22:
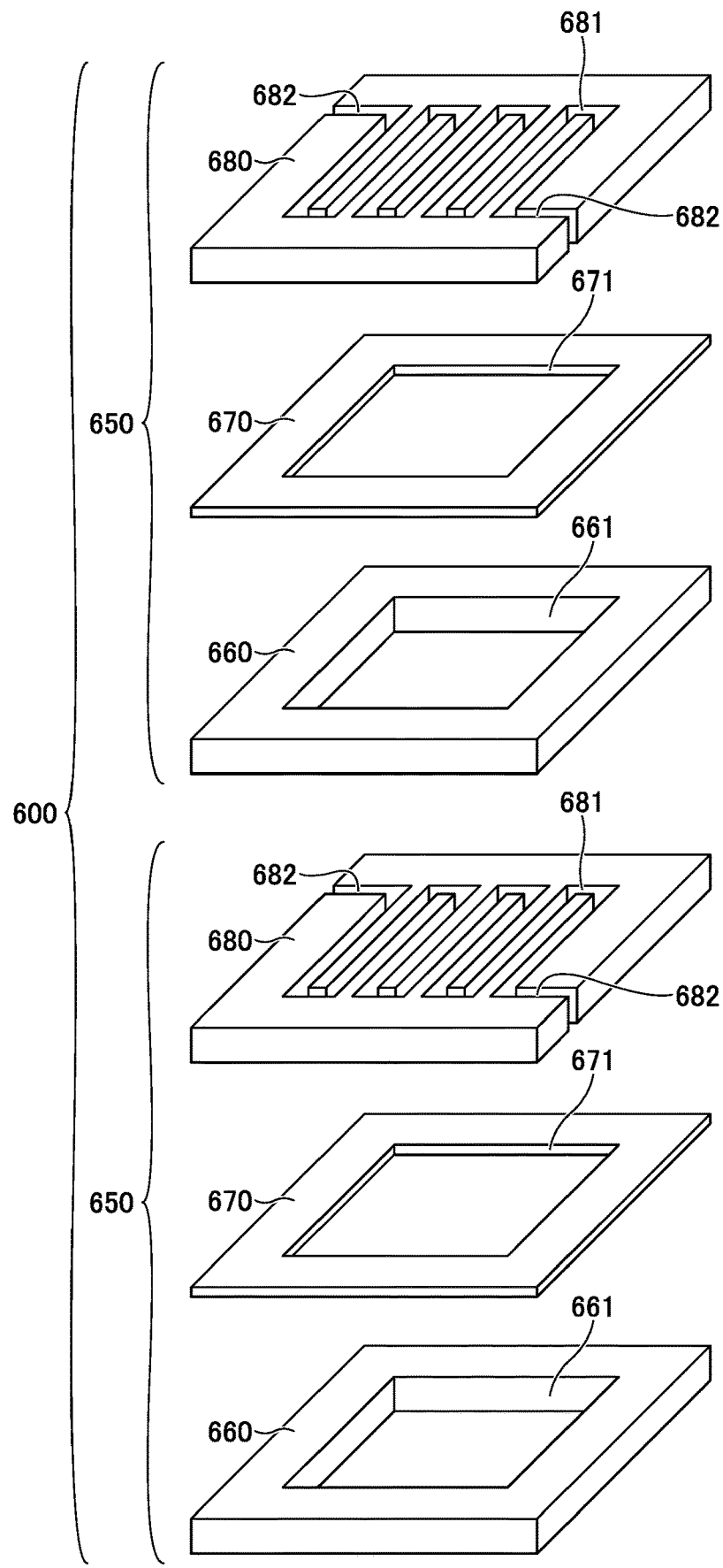
FIG. 22 is an exploded perspective view of the ion sensor according to the seventh embodiment of the present disclosure.

FIG. 22 is an exploded perspective view of the ion sensor 700 according to the seventh embodiment of the present disclosure.

FIG. 21B illustrates the sectional view indicated by the two-dot chain line as illustrated in FIG. 21A.

As illustrated in FIG. 21A, FIG. 21B, and FIG. 22, the ion sensor 700 according to the seventh embodiment of the present disclosure has two silicon on insulator (SOI) substrates 650. The configurations of the SOI substrate 650 in the present embodiment are the same as those of the sixth embodiment of the present disclosure. In the ion sensor 700, the two SOI substrates 650 are bonded together such that the base layer 660 of one of the two SOI substrates 650 faces the active layer 680 of the other one of the two SOI substrates 650, and the arrangements of the slits 681 of those SOI substrates 650 overlap with each other in a planar view. Moreover, the arrangements of the slits 661 and the slits 671 of those SOT substrates 650 overlap with each other in a planar view.

Note also that the insulator is not necessarily made of an insulating material in its entirety, and it is satisfactory as long as the ion filter and the ion sensing electrode are electrically insulated from each other.

The materials of the insulator are not limited to any particular materials, but it is desired that the insulator has dielectric breakdown strength of equal to or greater than 100 kV/mm, and it is even more desirable if the insulator has dielectric breakdown strength of equal to or greater than 200 kV/mm. Such dielectric breakdown strength is desirable to reduce the possibility of dielectric breakdown between the ion filter and the ion sensing electrode when the thickness of the insulator is reduced. The dielectric breakdown strength of various kinds of materials are given below in Table 1. In particular, $SiO_2$, $Si_3N_4$, and $Al_2O_3$ are desirable for the materials of the insulator.

TABLE 1

| Material | Dielectric Breakdown Strength (kV/mm) |
|---|---|
| AIR | 3 |
| $SiO_2$ | 200 |
| $Si_3N_4$ | 1000 |
| $Al_2O_3$ | 600 |
| WHITE MICA | 25 to 70 |
| SODA LIME GLASS | 5 to 20 |
| BOROSILICATE GLASS | 20 to 35 |
| SILICEOUS ALUMINA PORCELAIN | 10 |
| ALUMINA PORCELAIN | 10 to 16 |
| BUTYL RUBBER | 20 to 30 |
| SILICONE RUBBER | 15 to 20 |
| LOW-DENSITY POLYETHYLENE | 17 to 40 |
| POLYPROPYLENE | 20 to 26 |
| HARD POLYVINYL CHLORIDE | 14 to 20 |
| POLYSTYRENE | 20 to 28 |
| POLYMETHYLMETHACRYLATE | 15 to 22 |

TABLE 1-continued

| Material | Dielectric Breakdown Strength (kV/mm) |
|---|---|
| POLYCARBONATE | 15 |
| POLYTETRAFLUOROETHYLENE | 19 |
| EPOXY (FILLED WITH GLASS FIBER) | 14 |
| EPOXY (NO FILLER) | 16 to 20 |

Eighth Embodiment

An eighth embodiment of the present disclosure is described below.

Figure 23:
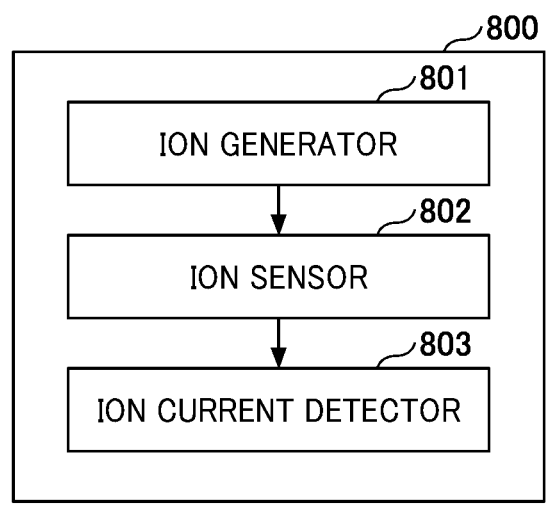
FIG. 23 is a block diagram of a configuration of an FAIMS system according to an eighth embodiment of the present disclosure.

FIG. 23 is a block diagram of a configuration of a field asymmetric ion mobility spectrometry (FAIMS) system 800 according to the eighth embodiment of the present disclosure.

The FAIMS system 800 according to the eighth embodiment includes an ion sensor 802, an ion generator 801 arranged before the ion sensor 802, and an ion current detector 803 that detects the electric current generated at the ion sensing electrode of the ion sensor 802. The ion generator 801 ionizes the molecules to be measured. The ion sensor 802 according to the present embodiment may be any of the ion sensors according to the first to seventh embodiments of the present disclosure.

As the FAIMS system 800 includes one of the ion sensors according to the first to seventh embodiments of the present disclosure, high detectivity can be achieved.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. An ion sensor comprising:
    an ion filter including a first electrode and a second electrode, the first electrode and the second electrode facing each other;
    an ion sensing electrode with which ions of a drift gas that have passed through the ion filter collide;
    an insulator configured to electrically insulate the ion sensing electrode from the first electrode and the second electrode; and
    an SOI substrate including a base layer, an insulating layer, and an active layer,
    wherein the ion sensing electrode is disposed on the base layer,
    wherein the insulator is disposed on the insulating layer,
    wherein the first electrode and the second electrode are disposed on the active layer,
    wherein the ion traverses in a space between the first electrode and the second electrode on the active layer, past the insulator disposed on the insulating layer, and to the ion sensing electrode on the base layer,
    wherein the insulating layer is between the base layer and the active layer, the base layer is directly disposed on the insulating layer, and the insulating layer is directly disposed on the active layer,
    wherein the active layer and the insulating layer include slits having a length extending in a first direction, and base layer includes slits having a length extending in a second direction which is perpendicular to the first direction, and wherein the first direction and the second direction are substantially perpendicular to a direction of travel of the ions when the ions traverse the space between the first electrode and the second electrode.

2. The ion sensor according to claim 1, wherein the insulator has a slit extending parallel to a direction of travel of the ion.

3. The ion sensor according to claim 1, wherein the insulator has dielectric breakdown strength of equal to or greater than 100 kV/mm.

4. The ion sensor according to claim 3, wherein the insulator has a film of one of $SiO_2$, $Si_3N_4$, and $Al_2O_3$.

5. An ion sensor comprising:
an ion filter including a first electrode and a second electrode, the first electrode and the second electrode facing each other;
an ion sensing electrode with which ions of a drift gas that have passed through the ion filter collide;
an insulator configured to electrically insulate the ion sensing electrode from the first electrode and the second electrode;
a first SOI substrate including a first base layer, a first insulating layer, and a first active layer; and
a second SOI substrate including a second base layer, a second insulating layer, and a second active layer, the second base layer contacting the first base layer,
wherein the ion sensing electrode is disposed on the first active layer,
wherein the insulator is disposed on the first insulating layer and the second insulating layer,
wherein the first electrode and the second electrode are disposed on the second active layer,
wherein the ion traverses in a space between the first electrode and the second electrode on the second active layer, past the insulator disposed on the first insulating layer and the second insulating layer, and to the ion sensing electrode on the first active layer,
wherein the first insulating layer is between the first base layer and the first active layer, the first base layer is directly disposed on the first insulating layer, and the first insulating layer is directly disposed on the first active layer,
wherein the second insulating layer is between the second base layer and the second active layer, the second base layer is directly disposed on the second insulating layer, and the second insulating layer is directly disposed on the second active layer,
wherein the first active layer and the second active layer include slits having a length extending in a same direction,
the first insulating layer, the first base layer, the second insulating layer and the second base layer include a single opening without slits, and
wherein said same direction is substantially perpendicular to a direction of travel of the ions when the ions traverse the space between the first electrode and the second electrode.

6. An ion sensor comprising:
an ion filter including a first electrode and a second electrode, the first electrode and the second electrode facing each other;
an ion sensing electrode with which ions of a drift gas that have passed through the ion filter collide;
an insulator configured to electrically insulate the ion sensing electrode from the first electrode and the second electrode;
a first SOI substrate including a first base layer, a first insulating layer, and a first active layer; and
a second SOI substrate including a second base layer, a second insulating layer, and a second active layer, the second active layer contacting the first base layer,
wherein the ion sensing electrode is disposed on the first active layer,
wherein the insulator is disposed on the second insulating layer, and
wherein the first electrode and the second electrode are disposed on the second active layer,
wherein the ion traverses in a space between the first electrode and the second electrode on the second active layer, past the insulator disposed on the second insulating layer, and to the ion sensing electrode on the first active layer,
wherein the first insulating layer is between the first base layer and the first active layer, the first base layer is directly disposed on the first insulating layer, and the first insulating layer is directly disposed on the first active layer,
wherein the second insulating layer is between the second base layer and the second active layer, the second base layer is directly disposed on the second insulating layer, and the second insulating layer is directly disposed on the second active layer,
wherein the first active layer and the second active layer include slits having a length extending in a same direction,
the first insulating layer, the first base layer, the second insulating layer and the second base layer include a single opening without slits, and
wherein said same direction is substantially perpendicular to a direction of travel of the ions when the ions traverse the space between the first electrode and the second electrode.

7. The ion sensor according to claim 1,
wherein the ion sensing electrode has an electrically-conductive first Si layer,
wherein the first electrode and the second electrode have an electrically-conductive second Si layer,
wherein the insulator has a SiO2 film.

8. The ion sensor according to claim 1, wherein the ion sensing electrode has a third electrode and a fourth electrode, and the third electrode and the fourth electrode are electrically insulated from each other.

9. A field asymmetric ion mobility spectrometry system, comprising:
the ion sensor according to claim 1;
an ion generator arranged before the ion sensor; and
an ion current detector configured to detect electric current generated at the ion sensing electrode.

10. The ion sensor according to claim 6, wherein the insulator has a slit extending parallel to a direction of travel of the ion.

11. The ion sensor according to claim 6, wherein the insulator has dielectric breakdown strength of equal to or greater than 100 kV/mm.

12. The ion sensor according to claim 11, wherein the insulator has a film of one of $SiO_2$, $Si_3N_4$, and $Al_2O_3$.

13. The ion sensor according to claim 6,
wherein the ion sensing electrode has an electrically-conductive first Si layer, wherein the first electrode and the second electrode have an electrically-conductive second Si layer, wherein the insulator has a SiO2 film.

14. The ion sensor according to claim 6, wherein the ion sensing electrode has a third electrode and a fourth electrode, and the third electrode and the fourth electrode are electrically insulated from each other.

15. A field asymmetric ion mobility spectrometry system, comprising:

the ion sensor according to claim 6;

an ion generator arranged before the ion sensor; and an ion current detector configured to detect electric current generated at the ion sensing electrode.

\* \* \* \* \*